US009767847B2

(12) United States Patent
Yanagita

(10) Patent No.: US 9,767,847 B2
(45) Date of Patent: Sep. 19, 2017

(54) IMAGE PROCESSING APPARATUS, IMAGE PROCESSING METHOD, AND RECORDING MEDIUM

(71) Applicant: Sony Corporation, Tokyo (JP)

(72) Inventor: Noboru Yanagita, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/405,490

(22) Filed: Jan. 13, 2017

(65) Prior Publication Data

US 2017/0133056 A1 May 11, 2017

Related U.S. Application Data

(60) Continuation of application No. 15/225,931, filed on Aug. 2, 2016, now Pat. No. 9,583,145, which is a
(Continued)

(30) Foreign Application Priority Data

Feb. 7, 2000 (JP) .................................. 2000-029089
Apr. 10, 2000 (JP) .................................. 2000-113278

(51) Int. Cl.
*H04N 5/76* (2006.01)
*G11B 27/032* (2006.01)
(Continued)

(52) U.S. Cl.
CPC ...... *G11B 27/032* (2013.01); *G11B 20/10527* (2013.01); *G11B 27/031* (2013.01);
(Continued)

(58) Field of Classification Search
None
See application file for complete search history.

(56) References Cited

U.S. PATENT DOCUMENTS 5,798,991 A 8/1998 Haneda
5,819,250 A 10/1998 Trader et al.
(Continued)

FOREIGN PATENT DOCUMENTS

EP 0 945 862 9/1999
EP 1 102 271 5/2001
(Continued)

OTHER PUBLICATIONS

Japanese Office Action dated Apr. 24, 2012.
(Continued)

*Primary Examiner* — Eileen Adams
(74) *Attorney, Agent, or Firm* — Haug Partners LLP; William S. Frommer

(57) ABSTRACT

The present invention comprises an input part for inputting image data, a receiving part for receiving production information relating to production transmitted from another apparatus, a recording part for recording the production information received by the receiving part and image data input by the input part, a detection part for detecting a recording position on a recording medium at an editing point of image data recorded by the recording part, and a transmission part for transmitting information of the recording position detected by the detection part, whereby identification information for identifying image data and voice data is recorded in a recording medium or a recording device, this relieving a burden on a photographer and an editor and facilitating extraction of image data and voice data.

21 Claims, 27 Drawing Sheets

Related U.S. Application Data continuation of application No. 15/003,866, filed on Jan. 22, 2016, now Pat. No. 9,437,244, which is a continuation of application No. 14/510,245, filed on Oct. 9, 2014, now Pat. No. 9,275,679, which is a continuation of application No. 13/422,673, filed on Mar. 16, 2012, now Pat. No. 8,886,018, which is a continuation of application No. 11/788,205, filed on Apr. 19, 2007, now Pat. No. 8,311,395, which is a division of application No. 09/971,537, filed on Oct. 3, 2001, now Pat. No. 7,613,380, which is a continuation of application No. PCT/JP01/00865, filed on Feb. 7, 2001.

(51) Int. Cl.

| | | |
|---|---|---|
| *G11B 27/034* | (2006.01) | |
| *G11B 27/11* | (2006.01) | |
| *G11B 27/28* | (2006.01) | |
| *G11B 27/34* | (2006.01) | |
| *H04N 5/222* | (2006.01) | |
| *H04N 5/77* | (2006.01) | |
| *H04N 5/781* | (2006.01) | |
| *H04N 5/92* | (2006.01) | |
| *G11B 20/10* | (2006.01) | |
| *G11B 27/031* | (2006.01) | |
| *G11B 27/10* | (2006.01) | |
| *H04N 5/91* | (2006.01) | |
| *H04N 5/926* | (2006.01) | |

(52) U.S. Cl.
CPC ............ *G11B 27/034* (2013.01); *G11B 27/10* (2013.01); *G11B 27/11* (2013.01); *G11B 27/28* (2013.01); *G11B 27/34* (2013.01); *H04N 5/222* (2013.01); *H04N 5/77* (2013.01); *H04N 5/772* (2013.01); *H04N 5/781* (2013.01); *H04N 5/91* (2013.01); *H04N 5/9201* (2013.01); *G11B 2020/10537* (2013.01); *G11B 2020/10916* (2013.01); *G11B 2220/41* (2013.01); *G11B 2220/655* (2013.01); *G11B 2220/90* (2013.01); *H04N 5/9264* (2013.01)

(56) References Cited

U.S. PATENT DOCUMENTS

| | | | |
|---|---|---|---|
| 5,983,267 | A | 11/1999 | Shklar et al. |
| 6,275,529 | B1 | 8/2001 | Sato |
| 6,460,018 | B1 | 10/2002 | Kasai et al. |
| 7,170,632 | B1 | 1/2007 | Kinjo |
| 7,613,380 | B2 | 11/2009 | Yanagita |
| 2001/0046330 | A1 | 11/2001 | Shaffer et al. |
| 2002/0032027 | A1 | 3/2002 | Kirani et al. |
| 2012/0171962 | A1 | 7/2012 | Yanagita |

FOREIGN PATENT DOCUMENTS

| | | |
|---|---|---|
| JP | 06-276436 | 9/1994 |
| JP | 7-123241 | 5/1995 |
| JP | 08-154228 | 6/1996 |
| JP | 08-279922 | 10/1996 |
| JP | 8 322091 | 12/1996 |
| JP | 9-98323 | 4/1997 |
| JP | 9-312825 | 12/1997 |
| JP | 9-322102 | 12/1997 |
| JP | 10-042177 | 2/1998 |
| JP | 10-161227 | 6/1998 |
| JP | 10-285501 | 10/1998 |
| JP | 11-136631 | 5/1999 |
| JP | 11-187363 | 7/1999 |
| JP | 11 212170 | 8/1999 |
| JP | 11-215421 | 8/1999 |
| JP | 11-252490 | 9/1999 |
| JP | 11-266434 | 9/1999 |
| JP | 11252490 A1 | 9/1999 |
| JP | 2000-13723 | 1/2000 |
| JP | 2000-013724 | 1/2000 |
| JP | 2000-029091 | 1/2000 |
| JP | 2000 92419 | 3/2000 |
| WO | WO 97 39411 | 10/1997 |

OTHER PUBLICATIONS

Patent Abstracts of Japan, vol. 1997, No. 02, Feb. 28, 1997 (Feb. 28, 1997) & JP 08-279922 A (Sony Corporation), Oct. 22, 1996 (Oct. 22, 1996).

Gathering_Start_DateTime
Gathering_End_DateTime
Gathering_Location_Place(PLACE NAME)
Photographer
Journalist Information
Director
Producer
Title(Slug)
Contents(Memo)(Description)
NCS ID

FIG.2

Gathering_Start_DateTime
Gathering_End_DateTime
Gathering_Location_Place(PLACE NAME)
Photographer
Journalist Information
Director
Producer
Title(Slug)
Contents(Memo)(Description)
NCS ID

Gathering_Start_DateTime
Gathering_End_DateTime
Gathering_Location_Latitude(GPS LATITUDE)
Gathering_Location_Longitude(GPS LONGITUDE)
Gathering_Location_Altitude(GPS ALTITUDE)
Gathering_Location_Time(GPS Time)
Gathering_Location_Place(PLACE NAME)
Photographer
Journalist Information
Director
Producer
MACHINE ID
Camera Setup Information
Reel ID
Duration(Time)
SOM
Title(Slug)
Contents(Memo)(Description)
Good Shot Mark & REC Start Mark
Audio Channel Info
Audio Type(MONAURAL/STEREO/BILINGUAL)
UMID(Video)
UMID(Audio)
Copyright

FIG.4B

Source
STC
Format(DV/MPEG_MP@ML/MPEG_4:2:2P@ML/...etc.)
COMPRESSION RATIO(Video Bit Rate)
GOP Size
Resolution(720*512,720*480,480*480,352*480)
Audio Channel NUMBER
Audio Compression(Compressed/Uncompressed)
Audio Sampling Rate
Audio Data Size
REC_Type(Auto/Manual/GPI/Endless/Open End)
Material_ID
Sub Key(Version,Segment,Revision)
UMID(Data)
UMID(System)
NCS ID
File Length(Time)
Essence_Size(Byte)
Object Type(Still,Audio,Video,Key Source)
Valid Date

FIG.5A

Gathering_Start_DateTime
Gathering_End_DateTime
Gathering_Location_Latitude(GPS LATITUDE)
Gathering_Location_Longitude(GPS LONGITUDE)
Gathering_Location_Altitude(GPS ALTITUDE)
Gathering_Location_Time(GPS Time)
Gathering_Location_Place(PLACE NAME)
Photographer
Journalist Information
Director
Producer
MACHINE ID
Camera Setup Information
Reel ID
Duration(Time)
SOM
Title(Slug)
Contents(Memo)(Description)
Good Shot Mark & REC Start Mark
Audio Channel Info
Audio Type(MONAURAL/STEREO/BILINGUAL)
UMID(Video)
UMID(Audio)
Copyright

FIG.5B

Source
STC
Format(DV/MPEG_MP@ML/MPEG_4:2:2P@ML/...etc.)
COMPRESSION RATIO(Video Bit Rate)
GOP Size
Resolution(720*512,720*480,480*480,352*480)
Audio Channel NUMBER
Audio Compression(Compressed/Uncompressed)
Audio Sampling Rate
Audio Data Size
REC_Type(Auto/Manual/GPI/Endless/Open End)
Material_ID
Sub Key(Version,Segment,Revision)
UMID(Data)
UMID(System)
NCS ID
File Length(Time)
Essence_Size(Byte)
EDL_Info
Object Type(Still,Audio,Video,Key Source)
Valid Date
Script Gathering_Start_DateTime
Gathering_End_DateTime
Gathering_Location_Latitude(GPS LATITUDE)
Gathering_Location_Longitude(GPS LONGITUDE)
Gathering_Location_Altitude(GPS ALTITUDE)
Gathering_Location_Time(GPS Time)
Gathering_Location_Place(PLACE NAME)
Photographer
Journalist Information
Director
Producer
MACHINE ID
Camera Setup Information
Reel ID
Duration(Time)
SOM
Title(Slug)
Contents(Memo)(Description)
Good Shot Mark & REC Start Mark
Audio Channel Info
Audio Type(MONAURAL/STEREO/BILINGUAL)
UMID(Video)
UMID(Audio)
Copyright

FIG.6A

Source
STC
Format(DV/MPEG_MP@ML/MPEG_4:2:2P@ML/...etc.)
COMPRESSION RATIO(Video Bit Rate)
GOP Size
Resolution(720*512,720*480,480*480,352*480)
Audio Channel NUMBER
Audio Compression(Compressed/Uncompressed)
Audio Sampling Rate
Audio Data Size
REC_Type(Auto/Manual/GPI/Endless/Open End)
Material_ID
Sub Key(Version,Segment,Revision)
UMID(Data)
UMID(System)
NCS ID
File Length(Time)
Essence_Size(Byte)
EDL_Info
Object Type(Still,Audio,Video,Key Source)
Valid Date
Script

FIG.6B

| PERIOD | JAPANESE | ENGLISH | SMPTE Dictionary |
|---|---|---|---|
| F | GATHERING LOCATION (GPS LATITUDE) | Gathering_Location_Latitude | 07 01 05 02 04 00 00 00 |
| F | GATHERING LOCATION (GPS LONGITUDE) | Gathering_Location_Longitude | 07 01 05 02 06 00 00 00 |
| F | GATHERING LOCATION (GPS ALTITUDE) | Gathering_Location_Altitude | 07 01 05 02 02 00 00 00 |
| F | GATHERING LOCATION TIME (GPS TIME) | Gathering_Location_Time | 07 02 01 01 01 01 00 00 |
| F | GATHERING LOCATION PLACE | Gathering_Location_Place | 07 01 20 01 00 00 00 00 |
| F | UMID(VIDEO) | UMID for Video essence | 01 01 01 xx nl nl nl nl |
| F | UMID(AUDIO) | UMID for Audio essence | 01 01 02 xx nl nl nl nl |
| F | UMID(DATA) | UMID for Data essence | 01 01 03 xx nl nl nl nl |
| F | UMID(SYSTEM) | UMID for System Information | 01 01 04 xx nl nl nl nl |
| F | PHOTOGRAPHER | Photographer | 20 30 01 02 01 00 00 00 |
| F | JOURNALIST | Journarist Information | 20 30 01 02 01 00 00 00 |
| F | DIRECTOR | Director | 20 30 01 02 01 00 00 00 |
| F | GOOD SHOT MARKER | Good Shot Mark & REC Start Mark | |
| F | CAMERA SETUP INFORMATION | Camera Setup Information | |
| T | MACHINE ID | Machine ID | in UMID |
| T | TAKE NUMBER | Take Number | 01 05 01 07 00 00 00 00 |
| T | START OF MATERIAL TIME CODE | Start of Material | |
| T | CONTENTS DESCRIPTION | Contents(MEMO)(Description) | |
| T | VALID DATE | Valid Date | |
| T | AUDIO CHANNEL INFORMATION | Audio Channel Imformation | 07 02 03 00 00 00 00 00 |
| T | AUDIO TYPE | Audio Type | |
| T | SOURCE INFORMATION | Source | |
| T | ENROLMENT FORMAT | Format | |
| T | COMPRESSION RATIO | Compression ratio(Video Bit Rate) | |
| T | AUDIO NUMBER OF CHANNEL | Audio Number of Channel | |
| T | AUDIO COMPRESSION RATIO | Audio Compression | |
| T | AUDIO SAMPLING RATE | Audio Sampling Rate | |

FIG.9

| PERIOD | JAPANESE | ENGLISH | SMPTE Dictionary |
|---|---|---|---|
| T | AUDIO DATA SIZE | Audio Data Size | |
| T | ENROLMENT METHOD | REC Type | |
| T | MATERIAL ID | Material ID | |
| T | SUB KEY | Sub Key | |
| T | FILE LENGTH | File Length | |
| Sh | GATHERING START DATE TIME (INCLUDING TIME DIFFERENCE) | Gathering_Start_Date Time | 07 02 01 02 01 00 00 00 |
| Sh | GATHERING END DATE TIME (INCLUDING TIME DIFFERENCE) | Gathering_End_Date Time | 07 02 01 02 02 00 00 00 |
| Sh | RECORDING START DATE TIME (INCLUDING TIME DIFFERENCE) | REC_Start_Date Time | 07 02 01 02 01 00 00 00 |
| Sh | RECORDING END DATE TIME (INCLUDING TIME DIFFERENCE) | REC_End_Date Time | 07 02 01 02 01 00 00 00 |
| Sh | RECORDING OPERATOR | Recording_Operater | 02 30 01 02 01 00 00 00 |
| Sh | FILE OWNER | File_Owner | |
| Sh | CHANGED BY | Changed by | 02 30 01 02 01 00 00 00 |
| Sh | SHOT NUMBER | Shot Number | |
| Sh | DURATION TIME | Duration(Time) | 07 02 02 00 00 00 00 00 |
| Sh | GPO SIZE | GOP Size | |
| Sh | RESOLUTION | Resolution | |
| Sh | ESSENCE SIZE | Essence Size(Bite) | |
| Sh | OBJECT TYPE | Object Type | |
| Sh | INDEX | Index | |
| Sh | INDEX TYPE | Index_Type | |
| Sh | INDEX MEMO | Index_Memo | |
| Sc | SCENE NUMBER | Scene Number | 01 05 01 06 00 00 00 00 |
| Sc | RECORDING TERMINAL | Rcording Terminal | |
| Sc | RECORDING PORT | REC Port | |
| M | REEL NUMBER | Reel Number | 01 03 01 02 02 00 00 00 |
| P | COPYRIGHT | Copyright | |
| P | MODIFIED DATE TIME (INCLUDING TIME DIFFERENCE) | Modified_DateTime | 07 02 05 02 00 00 00 00 |

FIG.10

| PERIOD | JAPANESE | ENGLISH | SMPTE Dictionary |
|---|---|---|---|
| P | ON AIR DATE TIME (INCLUDING TIME DIFFERENCE) | OnAir_DateTime | 07 02 10 03 00 00 00 00 |
| P | ARCHIVE DATE TIME (INCLUDING TIME DIFFERENCE) | Archive_DateTime | |
| P | PRODUCER | Producer | 02 30 01 02 01 00 00 00 |
| P | PLAYOUT OPERATOR | Playout_Operator | 02 30 01 02 01 00 00 00 |
| P | ARCHIVE OPERATOR | Archive_Operator | 02 30 01 02 01 00 00 00 |
| P | NEWS GATHERING TITLE | Title(Slug) | 01 05 01 02 00 00 00 00 |
| P | PLAYOUT TERMINAL | Playout Terminal | |
| P | PLAYOUT PORT | Playout Port | |
| P | ARCHIVE TERMINAL | Archive Terminal | |
| P | NCS ID | NCS ID | |
| P | EDITING DECISION LIST | EDL | |
| P | SCRIPT | Script | |
| P | PREVIEW FLAG | Preview_Flag | |
| P | PREVIEW COUNTER | Preview_Counter | |
| P | ON AIR FLAG | OnAir_Flag | |
| P | ON AIR COUNTER | OnAir_Counter | |
| P | ARCHIVE FLAG | Archive_Flag | |
| P | COMPILE FLAG | Compile_Flag | |
| P | DISTRIBUTION FLAG | Distribution_Flag | |
| P | RECYCLE FLAG | Recycle(Delete)_Flag | |
| P | FILE STATUS | File_Status_bit | |

FIG.11

PORTABLE TELEPHONE NO. 090-XXXX-XXXX

| PHOTOGRAPHING START DATE TIME | NCS ID | GATHERING TITLE | PHOTOGRAPHER | JOURNALIST |
|---|---|---|---|---|
| 2000/3/3 9:00-10:00 | 0001 | PRIME MINISTER INTERVIEW | A | D |
| 2000/3/3 13:00-14:30 | 0002 | STREET INTERVIEW | B | E |
| 2000/3/3 17:00-19:00 | 0003 | PRESS CLUB GATHERING | C | F |
|  |  |  |  |  |
|  |  |  |  |  |

FIG.22

IMAGE PROCESSING APPARATUS, IMAGE PROCESSING METHOD, AND RECORDING MEDIUM

This is a continuation of application Ser. No. 15/225,931, filed Aug. 2, 2016, which is a continuation of application Ser. No. 15/003,866, filed Jan. 22, 2016, now U.S. Pat. No. 9,437,244, issued Sep. 6, 2016, which is a continuation of application Ser. No. 14/510,245, filed Oct. 9, 2014, now U.S. Pat. No. 9,275,679, issued Mar. 1, 2016, which is a continuation of application Ser. No. 13/422,673, filed Mar. 16, 2012, now U.S. Pat. No. 8,886,018, issued on Nov. 11, 2014, which is a continuation of application Ser. No. 11/788,205, filed Apr. 19, 2007, now U.S. Pat. No. 8,311,395, issued on Nov. 13, 2012, which is a division of application Ser. No. 09/971,537, filed Oct. 3, 2001, now U.S. Pat. No. 7,613,380, issued on Nov. 3, 2009, which is a continuation of international application number PCT/JP01/00865, having an international filing date of Feb. 7, 2001, which is entitled to the priority filing dates of Japanese application numbers 2000-029089 and 2000-113278, filed in Japan on Feb. 7, 2000 and Apr. 10, 2000, respectively, the entirety of which is incorporated herein by reference.

TECHNICAL FIELD

The present invention relates to an image processing apparatus for recording image data and discrimination information for discriminating image data in a recording medium, an image processing method and an image processing system; a data transmission apparatus, a data receiving apparatus and a data transmitting and receiving system; and a recording medium, and more particularly to an image processing apparatus for recording production information at the time of producing image data and editing information at the time of editing together with image data, and an image processing method; an image processing apparatus for transmitting production information at the time of producing image data to another apparatus to record the former together with image data, and an image processing method; an image processing system for receiving image data from another apparatus and production information to transmit position information at the editing point to another apparatus, a data receiving apparatus for receiving production information from another apparatus, and a data transmission apparatus for transmitting discrimination information to another apparatus; a data transmitting and receiving system constituted by the data transmission apparatus and the data receiving apparatus, and a recording medium having a program for the process of recording production information at the time of producing image data and editing information at the time of editing together with image data.

BACKGROUND ART

There has been popularized the art for recording information corresponding to an editing point as additional information together with image data when an image pick-up device records image data in a recording medium. An editor is able to retrieve an editing point as desired by referring to the additional information.

In the past, the additional information has been input as a photographer operates an input device provided on the image pick-up device before production. In this case, the image pick-up device records the input additional information and image data in the recording medium.

Further, one method for editing image information recorded in a recording medium such as a video tape is a off-line edition. The off-line edition is a method for copying, in a production site, image information recorded in an original tape to a separate recording tape (an editing tape) once, preparing editing data at the editing point on the editing tape, and preparing a master tape on the basis of the editing data. In the off-line edition, it is not feared that original image information recorded in an original tape, for being recording in an editing tape, is erased or rewritten by mistake, and a master tape as desired can be prepared.

However, in the off-line edition, editing work is carried out using an editing tape having an original tape copied, thus posing a problem that when information recorded on the original tape is coped on the editing tape, it takes time and involves trouble. So, one method for solving such a problem as noted above is a method for copying information on the original tape on a disk-like recording medium capable of recording and capable of random accessing such as a hard disk once, and preparing editing data using copied information on the disk-like recording medium. According to this method, since the time for getting access to the editing point is shortened, the time required for the editing work can be shortened. However, in the conventional editing device, when CG or the like is combined with image data, an editor need to input it, and data base is so enormous that work which is troublesome for an editor results. Further, for example, in a case where other information such as a map is combined with an image for display it, it has been necessary to retrieve and extract other information such as a map to be combined with image data from the data base.

On the other hand, with the popularization of communication making use of a network line (circuit) such as a so-called Internet in which a plurality of networks to thereby constitute an imaginary network, distribution of various content data such as image data, voice data and so on becomes enabled using the network line such as an Internet. With this, a broadcasting station for producing and broadcasting programs becomes necessary to administrate individual detailed information even with respect to fragmentary image data and voice data. More concretely, it is necessary to distribute various additional information such as information for discriminating a broadcasting material produced as a program in a broadcasting station or the like, information relating to copyright of contents, and so on together with contents.

DISCLOSURE OF THE INVENTION

It is an object of the present invention to provide an image processing apparatus in which a burden on a user using the image processing apparatus to input discrimination information is relieved, an image processing method and an image processing system; a data transmission apparatus for transmitting discrimination information, a data receiving apparatus for receiving discrimination information and a data transmitting and receiving system for transmitting and receiving discrimination information; and a recording medium having a program of process recorded, the process recording discrimination information of image data together with image data.

The present invention proposed in order to achieve the object as described above comprises an input part for inputting image data, a receiving part for receiving production information relating to production transmitted form another apparatus, a recording part for recording production information received by the receiving part and image data input by the input part in a recording medium, a detection part for detecting a recording position of an editing point of image data recorded by the recording part on the recording medium, and a transmission part for transmitting information of the recording position detected by the detection part to another apparatus.

Further, the present invention includes an input step of inputting image data, a receiving step of receiving production information relating to production transmitted form another apparatus, a recording step of recording production information received by the receiving step and image data input by the input step in a recording medium, a detection step of detecting a recording position of an editing point of image data recorded by the recording step on the recording medium, and a transmission step of transmitting information of the recording position detected by the detection step.

Further, the present invention provides a recording medium having recorded a program which controls an image processing apparatus for recording image data in a recording medium, the program causing a computer to execute a process including an input control step of controlling an input of image data, an incorporation control step of controlling an incorporation of production information relating to production transmitted from another apparatus, a record control step of controlling recording of production information whose incorporation is controlled in the incorporation control step and image data input in the input control step to the recording medium, a detection control step of controlling detection of a recording position of an editing point of image data record in the record control step on the recording medium, and a transmission control step of controlling transmission of information of the recording position detected in the detection control step to another apparatus.

Furthermore, the present invention comprises an input part for inputting production information relating to production by another apparatus, a storage part for storing production information input by the input part corresponded to another apparatus, a transmission part for transmitting production information stored in the storage part to another apparatus, a receiving part for receiving position information of an editing point of image data recorded in a recording medium on the recording medium, and an adding part for adding position information received by the receiving part to production information stored in the storage part.

Furthermore, the present invention includes an input step of inputting production information relating to production by another apparatus, a storage step of storing production information input by the input step corresponded to another apparatus, a transmission step of transmitting production information stored in the storage step to another apparatus, a receiving step of receiving position information of an editing point of image data recorded in a recording medium on the recording medium, and an adding step of adding position information received by the receiving step to production information stored in the storage step.

Furthermore present invention provides a recording medium having recorded a program which controls an image processing apparatus for administrating image data recorded in a recording medium by another image processing apparatus, the program causing a computer to execute a process including an input control step of controlling an input of production information relating to production by another apparatus, a storage control step of controlling storing production information input in the input control step corresponded to another apparatus, a transmission control step of controlling transmitting production information stored in the storage control step to another apparatus, an incorporation control step of controlling incorporating position information at an editing point of image data recorded in a recording medium transmitted from another apparatus on the recording medium, and an addition control step of controlling addition of position information incorporated in the incorporation control step to production information stored in the storage control step.

Furthermore, the present invention provides an image processing system comprising a first image processing apparatus for recording image data in a recording medium, and a second image processing apparatus for administrating image data recorded in the recording medium by the first image processing apparatus, the first image processing apparatus comprising a first input part for inputting image data, a first receiving part for receiving production information relating to production transmitted from the second image processing apparatus, a recording part for recording production information received by the first receiving part and image data input by the first input part, a detection part for detecting a recording position at an editing point of image data recorded by the recording part on the recording medium, and a first transmission part for transmitting information of a recording position detected by the detection part to the second image processing apparatus, the second image processing apparatus comprising a second input part for inputting production information relating to production by the first image processing apparatus, a storage part for storing production information input by the second input part corresponded to the first image processing apparatus, a second transmission part for transmitting production information stored in the storage part to the first image processing apparatus, a second receiving part for receiving position information at an editing point of image data recorded in a recording medium transmitted from the first image processing apparatus on the recording medium, and an addition part for adding position information received in the second receiving part to production information stored in the storage part.

Furthermore, in the present invention, a first image processing method of the first image processing apparatus includes a first input step of inputting image data, a first receiving step of receiving production information relating to production transmitted from the second image processing apparatus, a recording step of recording production information received in the first receiving step and image data input in the first input step, a detection step of detecting a recording position at an editing point of image data recorded in the recording step on the recording medium, and a first transmission step of transmitting information of a recording position detected in the detection step to the second image processing apparatus, and an image processing method of the second image processing apparatus includes a second input step of inputting production information relating to production by the first image processing apparatus, a storage step of storing production information input in the second input step corresponded to the first image processing apparatus, a second transmission step of transmitting production information stored in the storage step to the first image processing apparatus, a second receiving step of receiving position information at an editing point of image data recorded in a recording medium transmitted from the first image processing apparatus on the recording medium, and an addition step for adding position information received in the second receiving step to production information stored in the storage step.

Furthermore, the present invention provides a recording medium having recorded programs which control an image processing system comprising a first image processing apparatus for recording image data in a recording medium, and a second image processing apparatus for administrating image data recorded in the recording medium by the first image processing apparatus, the program for controlling the first image processing apparatus including a first input control step of controlling an input of image data, a first incorporation control step of controlling incorporation of production information relating to production transmitted from the second image processing apparatus, a record control step of controlling recording of production information incorporated in the first incorporation control step and image data input in the first input control step in the recording medium, a detection control step of controlling detection of a recording position of an editing point of image data recorded in the record control step on the recording medium, and a first transmission control step of controlling transmission of information of the recording position detected in the detection control step, the program for controlling the second image processing apparatus having a program for causing a computer to execute a process recorded, the process including a second input control step of controlling an input of production information relating to production by the first image processing apparatus, a storage control step of controlling storing production information input in the second input control step corresponded to the first image processing apparatus, a second transmission control step of controlling transmission of production information stored in the storage control step to the first image processing apparatus, a second incorporation control step of controlling incorporation of position information at an editing point of image data recorded in the recording medium transmitted from the first image processing apparatus on the recording medium, and an addition control step of controlling adding position information incorporated in the second incorporation step to production information stored in the storage control step.

Furthermore, the present invention comprises an input part for producing and inputting at least one out of metadata representative of a gathering location place showing a place name of a gathering location relating to news program gathering (Gathering_Location_Place), a photographer showing a name of a photographer (Photographer), journalist information showing information relating to a journalist in charge of gathering (Journalist Information), a director showing a director of a news program (Director), contents having other information relating to production contents described (Contents), gathering start date time showing production start date time (Gathering_Start_DateTime), gathering end date time showing production end time (Gathering_End_DateTime), a producer showing a producer of a news program (Producer), a news program item registered in an NCS (Newsroom Computer System) and NCS ID as an identifier set for every program (NCS ID), and a transmission part for transmitting metadata to a mover at gathering destination wirelessly.

Furthermore, the present invention comprises a receiving part for receiving at least one out of metadata representative of a gathering location place showing a place name of a gathering location relating to news program gathering (Gathering_Location_Place), a photographer showing a name of a photographer (Photographer), journalist information showing information relating to a journalist in charge of gathering (Journalist Information), a director showing a director of a news program (Director), contents having other information relating to production contents described (Contents), gathering start date time showing production start date time (Gathering_Start_DateTime), gathering end date time showing production end time (Gathering_End_DateTime), a producer showing a producer of a news program (Producer), a news program item registered in an NCS (Newsroom Computer System) and NCS ID as an identifier set for every program (NCS ID), and a storage part for storing metadata received.

Furthermore, the present invention comprises an input part for producing and inputting at least one out of metadata representative of a gathering location place showing a place name of a gathering location relating to news program gathering (Gathering_Location_Place), a photographer showing a name of a photographer (Photographer), journalist information showing information relating to a journalist in charge of gathering (Journalist Information), a director showing a director of a news program (Director), contents having other information relating to production contents described (Contents), gathering start date time showing production start date time (Gathering_Start_DateTime), gathering end date time showing production end time (Gathering_End_DateTime), a producer showing a producer of a news program (Producer), a news program item registered in an NCS (Newsroom Computer System) and NCS ID as an identifier set for every program (NCS ID), a data transmission device having a transmission part for transmitting metadata wirelessly, a receiving part for receiving metadata relating to news program gathering transmitted from the data transmission device, a storage part for storing metadata received, and a data receiving device.

Furthermore, the present invention comprises a metadata storage part for storing metadata transmitted from outside, a metadata producing part for producing at least one out of metadata representative of a gathering location latitude representative of latitude of a photographing place (Gathering_Location_Latitude), a gathering location longitude representative of a longitude of a photographing place (Gathering_Location_Longitude), a gathering location altitude representative of altitude of a photographing place (Gathering_Location_Altitude), a gathering location time representative of time when photographing takes place (Gathering_Location_Time), machine ID for identifying a photographing device, camera setup information showing setting of a photographing device (Camera Setup Information), a reel number for identifying a recording medium (Reel Number), duration showing time required for photographing (Duration), start of material representative of start time of each scene (Start Of Material), a title representative of gathering title (Title), a good shot mark showing a mark point manually input when photographing take place (Good Shot Mark), record start mark (REC Start Mark), audio channel information showing a microphone channel (Audio Channel Information), al audio type showing if a voice record is mono, stereo or bilingual (Audio Type), UMID audio which is ID decided solely for identifying material (UMID (Audio)), UMID video (UMID (video)), copyright representative of copyright of material data (Copyright); and a recording part for recording image data in a recording medium, wherein metadata produced is recorded in the recording medium together with image data.

Furthermore, the present invention comprises a metadata storage step of storing metadata transmitted from outside, a metadata producing step of producing at least one out of metadata representative of a gathering location latitude representative of latitude of a photographing place (Gathering_Location_Latitude), a gathering location longitude representative of a longitude of a photographing place (Gathering_Location_Longitude), a gathering location altitude representative of altitude of a photographing place (Gathering_Location_Altitude), a gathering location time representative of time when photographing takes place (Gathering_Location_Time), machine ID for identifying a photographing device, camera setup information showing setting of a photographing device (Camera Setup Information), a reel number for identifying a recording medium (Reel Number), duration showing time required for photographing (Duration), start of material representative of start time of each scene (Start Of Material), a title representative of gathering title (Title), a good shot mark showing a mark point manually input when photographing take place (Good Shot Mark), record start mark (REC Start Mark), audio channel information showing a microphone channel (Audio Channel Information), an audio type showing if a voice record is mono, stereo or bilingual (Audio Type), UMID audio which is ID decided solely for identifying material (UMID (Audio)), UMID video (UMID (video)), copyright representative of copyright of material data (Copyright); and a recording step of recording metadata stored in the metadata storage step, metadata produced in the metadata producing step, and image data in a recording medium.

Furthermore, the present invention comprises an input step of inputting image data, a gathering location latitude representative of a latitude of a photographing place in connection with position information when image data is photographed (Gathering_Location_Latitude), a gathering location longitude representative of longitude of a photographing place (Gathering_Location_Longitude), and metadata representative of a gathering location altitude representative of altitude of a photographing place (Gathering_Location_Altitude); a retrieval step of retrieving and extracting a map corresponding to position information out of maps recorded in a recording device; and a combining step of combining and displaying the map corresponding to position information in a predetermined position of image data.

Furthermore, the present invention comprises an input step of inputting image data, and metadata representative of gathering location time representative of time when photographing takes place in connection with time information when image data is photographed (Gathering_Location_Time), and a combining step of combining and displaying time information corresponding to image data in a predetermined position of image data.

Furthermore, the present invention comprises an input step of inputting image data, and metadata representative of a title showing a gathering title in connection with photographing of image data (Title) and a script in connection with a news manuscript (Script); and a combining step of combining and displaying metadata in a predetermined position of image data.

Furthermore, the present invention comprises a display part for displaying a combined image of image data and information relating to image data; an input part for inputting metadata representative of a gathering location latitude representative of latitude of a photographing place in connection with image data and position information when image data is photographed (Gathering_Location_Latitude), a gathering location longitude representative of longitude (Gathering_Location_Longitude), a gathering location altitude representative of altitude of a photographing place (Gathering_Location_Altitude), a title showing a gathering title in connection with photographing of image data (Title), and metadata representative of a script in connection with a news manuscript (Script); a recording part for recording metadata showing position information; and a combining part for combining and displaying information based on metadata corresponding to image data in a predetermined position of image data.

Other objects of the present invention, and concrete advantages obtained by the present invention will become further apparent from the ensuing description with reference to the drawings.

BRIEF DESCRIPTION OF THE DRAWINGS

FIG. 2 is a view showing a concrete example of metadata produced in the planning step.

FIG. 3 is a view showing a concrete example of metadata transmitted from a base station to an image pick-up device in the course of shifting from the planning step to the gathering step.

FIG. 4A is a view showing a concrete example of metadata input in the image pick-up device at the time of photographing, and FIG. 4B is a view showing a concrete example of metadata input when stored in a material accumulation device.

FIG. 5A is a view showing a concrete example of metadata input in the image pick-up device at the time of photographing, and FIG. 5B is a view showing a concrete example of metadata input when a temporary editing is carried out in NCS.

FIG. 6A is a view showing a concrete example of metadata input in the image pick-up device at the time of photographing, and FIG. 6B is a view showing a concrete example of metadata input and or modified in the real editing step.

FIG. 9 is a view showing metadata used in an image processing system shown as one constitutional example of the present invention.

FIG. 10 is a view showing metadata used in an image processing system shown as one constitutional example of the present invention.

FIG. 11 is a view showing metadata used in an image processing system shown as one constitutional example of the present invention.

FIG. 22 is a view for explaining metadata used in an image processing system shown as one constitutional example of the present invention.

BEST MODE FOR CARRYING OUT THE INVENTION

Figure 1:
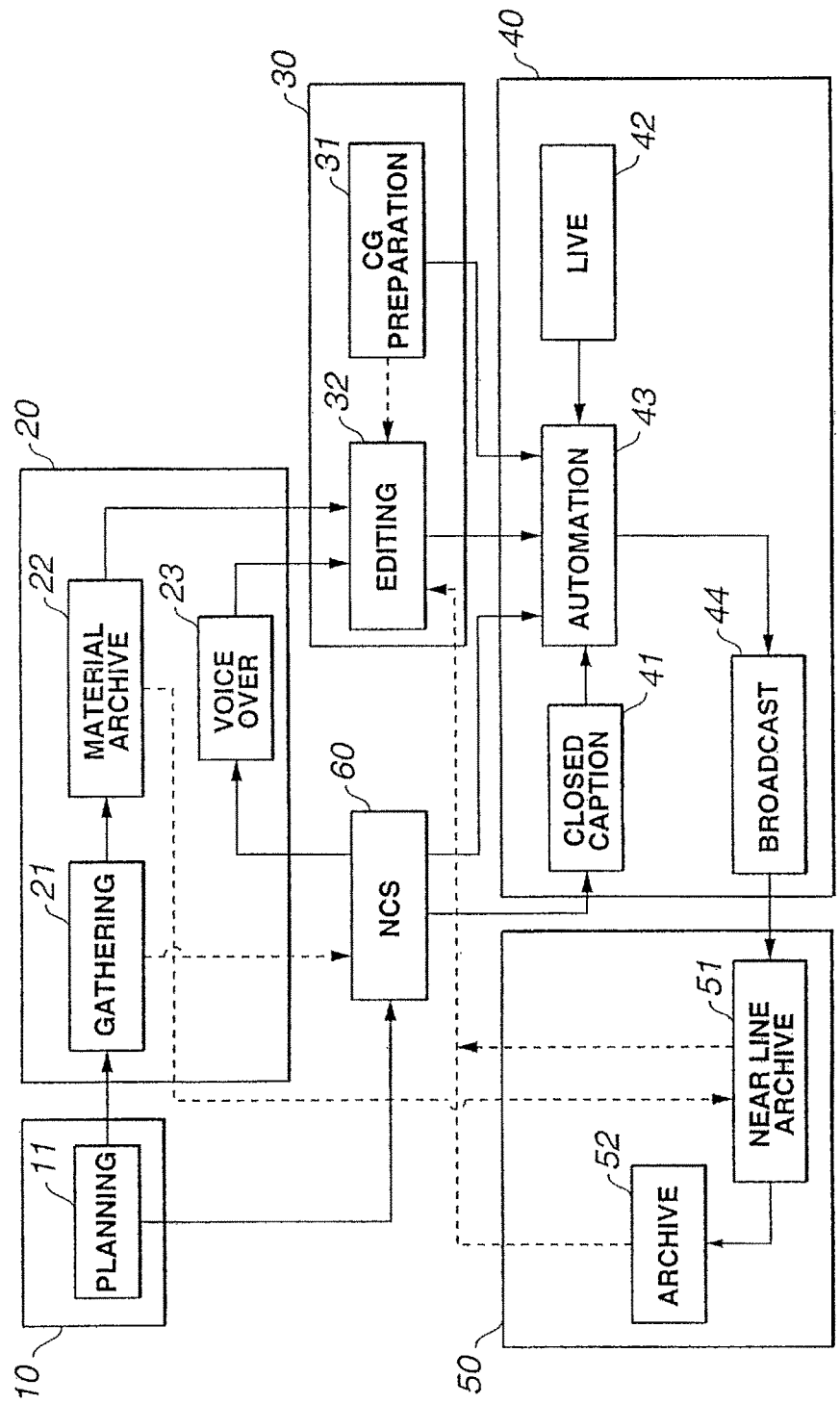
FIG. 1 is an explanatory view for explaining a series of steps of making a gathering plan to carry out gathering, editing material obtained by gathering to broadcast it, and archiving a program broadcast.

In the following, an image processing apparatus and an image processing method, an image processing system, a data transmission apparatus and a data receiving apparatus, a data transmitting and receiving system, and a recording medium according to the present invention will be described in detail with reference to the drawings.

The image processing system according to the present invention is, in an image processing apparatus for recording image data in a recording medium, an image processing apparatus comprising an input part for inputting image data, a recording part for recording production information in connection with photographing transmitted from other apparatuses and image data in a recording medium, a detection part for detecting a recording position on the recording at an editing point of image data recorded by the recording part, and a transmission part for transmitting information of the recording position detected by the detection part. This can be applied, for example, to an image processing system in which in a broadcasting station, an image producing company and the like, an image and voice or the like (hereinafter referred to as material) are edited and processed to produce an image for broadcasting, and the image is archived. Particularly, the image processing system according to the present invention is an image processing system in which information for identifying material is recorded in a recording medium or an exclusive-use recording server to thereby relieve a burden on a photographer or an editor, and when material is utilized, the material can be identified easily.

Hereupon, a description will be made of a case where the image processing system according to the present invention is applied to a step of producing a program in a broadcasting station and a program producing company. The stages for producing a program in a broadcasting station include an anterior photographing state 10, a photographing producing stage 20, a posterior photographing stage 30, a broadcasting stage 40, and an archive stage 50. The image processing system according to the present invention gives rise to an advantage that in the above-described stages, identification information for identifying image data and voice data is suitably added and recorded in a recording medium or an exclusive-use recording device whereby when image data and voice data are utilized, these material data can be retrieved immediately to put it to practical use for editing or the like.

It is noted that metadata can be mentioned as identification information to be added. The metadata termed herein is data for described information necessary for identifying material, for example, such as the gathering time, a gathering ID, a gathering title, and a reporter name.

For example, a case where a news program is produced in a broadcasting station will be described with reference to FIG. 1. Here, FIG. 1 explains a flow of work when a news program is produced, and is different from a so-called block diagram showing constitutional elements of apparatus or the like.

The news program production in a broadcasting station can be classified into five stages, as shown in FIG. 1, pre-production 10, production 20, post-production 30, distribution 40, and archive 50.

The pre-production 10 is a stage in which the persons concerned such as a producer, a director, an announcer, a gathering staff or the like make arrangements for broadcasting contents of a news program, in which stage, the decision of broadcasting items, the assignment of a relay mobile, a gathering machine, a gathering crew or the like are also carried out. This is shown as a planning step 11 in FIG. 1.

The production stage 20 is principally a stage for collecting an image and a voice, and in FIG. 1, acquisition step 21, ingest step 22, and voice over step 23 correspond to the production stage 20.

The acquisition step 21 shows "acquisition" for collecting an image and a voice. The ingest step 22 is a step of acquiring an image and a voice (hereinafter referred to as material) obtained by the acquisition. The ingest step 22 corresponds, for example, to archiving a video cassette tape or the like having material recorded in an archive shelf, or storing data of material in a material ingesting server. The voice over step 23 is a step of inserting a voice such as narration into an image.

The post-production step 30 is a step of editing the collected material to finish it into a state that can be broadcast. In FIG. 1, computer graphic (CG) preparing step 31 and complete edit step 32 correspond to the post-production step 30.

The computer graphic (CG) preparing step 31 is a step of preparing an image by the computer graphics, and preparing a map, a weather map, a letter or the like while being put on an image. The complete edit step 32 is a step of editing material on the basis of contents decided by the planning step 11.

The distribution stage is a step of on-air (broadcasting) material edited, and in FIG. 1, closed caption step 41, live 42, automation step 43 and distribution step 44 correspond to the distribution stage 40.

The closed caption step 41 shows a work step of preparing letters for letter distribution. The live 42 shows a case where a relay at real time is broadcast during broadcasting of a news program. The automation step 43 shows a work controlled by a computer to mix material edited, a closed caption signal and image data of the live 2 and produce a news program for broadcasting automatically. In the distribution step 44, a news program for broadcasting produced in the automation step 43 is transmitted.

The archive stage 50 is a stage for archiving image data and voice data, and in FIG. 1, near line archive step 51 and archive step 52 correspond to the archive stage 50.

The near line archive step 51 shows a step of temporarily archiving material to be likely used one of these days out of materials edited. The archive step 52 shows archiving material for a long period.

NCS 60 shown in FIG. 1 is a newsroom computer system, which is a system for generally administrating information of the whole newsroom. In the NCS 60, material administration such as administration of on-air items, and how individual material is processed in what stage, and buying and selling of material relative to a broadcasting station is also administrated. Further, in the NCS 60, a journalist sometimes prepares an article from a terminal connected to the NCS 60.

Next, in a case where a news program is produced, an example of metadata input in the aforementioned steps is illustrated. Details of the data construction of metadata will be described in detail later.

First, in the planning step 11, the decision of broadcasting items, and the assignment of a relay car, a gathering machine and a gathering crew are carried out. In the planning step 11, broadcasting contents of a news program is studied, and metadata is input on the basis of contents studied. FIG. 2 shows an example of metadata. Metadata decided in the planning step 11 include Gathering_Start_DateTime representative of photographing start time, Gathering_End_DateTime representative of photographing end time, Gathering_Location_Place representative of a photographing location name, Photographer representative of a photographer name, Journalist Information representative of information relating to a journalist, Director representative of a director for a news program, Producer representative of a producer for a news program, Title representative of a news gathering title, Contents having other information relating to photographing contents, and NCS ID as an identifier (ID) set every news program and broadcasting item registered in a newsroom computer system (NCS).

In the planning step 11, the metadata illustrated above are written in a memory or the like provided on the NCO 60. It is noted that the metadata described in the planning step 11 are modified and suitably rewritten in the step described later.

Doing the course of shifting to the acquisition step 21 from the planning step 11, metadata is transmitted to equipment for carrying out acquisition in the acquisition step 21, that is, the image pick-up device. An example of metadata transmitted is shown in FIG. 3. It can be contemplated that the course shifting from the planning step 11 to the acquisition step 21 termed herein is, for example, a period in which a relay car moves toward a gathering place.

In this course, metadata representative of Gathering_Start_DateTime, Gathering_End_DateTime, Gathering_Location_Place, Photographer, Journalist Information, Director, Producer, Title, Contents, and NCS ID are transmitted to an image pick-up device moving to a gathering place from a broadcasting station on the basis of contents of a news program studded in the planning step 11.

In the acquisition step 21, gathering is carried out. In the image pick-up device for recording material data used in the acquisition step 21, metadata received by a wireless communication are stored in a memory provided in the image pick-up device. The image pick-up device reads, when an image is photographed, the metadata from the memory to record it in the recording medium together with image data and voice data. At this time, the image pick-up device inputs, in addition to metadata transmitted from a broadcasting station, new metadata generated automatically. An example of metadata input newly is shown in FIG. 4A.

Metadata input newly in the acquisition step 21 include, in addition to the metadata shown in FIG. 3, Gathering_Location_Latitude (GPS latitude), Gathering_Location_Longitude (GPS longitude) and Gathering_Location_Altitude (GPS altitude) showing information detected by GPS (Global Positioning System), Gathering_Location_Time (GPS Time) detected by GPS, Gathering_Location_Place (location name) representative of a location name of a gathering place, machine ID which is ID every image pick-up device, Camera Setup Information showing lens information, Reel Number for identifying a recording medium, Duration (Time) showing time required for photographing, SOM (Start Of Material) showing start time of each scene, Good Shot Mark and REC Start Mark, Audio Channel Information showing assignment of a microphone, Audio Type showing a recording method for voice, UMID (Audio) and UMID (Video) for identifying material, and Copyright representative of copyright.

The above metadata are input into a recording medium and an exclusive-use recording server. The above metadata modified in the stage of the acquisition step 21 are sometimes transmitted to SCS 60 for use.

Material collected in the acquisition step are accumulated in the material recording server till chance for use comes through the stage of the ingest step 22. FIG. 4B shows an example of metadata input into the recording medium in the ingest step 22.

In the ingest step 22, input are, in addition of the metadata shown in FIG. 4A, Source representative of a supply source, STC (Start of Contents) representative of start time of material data, Format showing a type of a data stream, Video Bit Rate showing a compression ratio of image, GOP (Group Of Pictures) Size showing a picture group in a case where image data is MPEG compressed, Resolution representative of resolution, Audio Channel number representative of channel number of voice data, Audio Compression representative whether or not voice data is compressed, Audio Sampling Rate representative of audio sampling frequency, Audio Data Size representative of size of voice data, REC_Type showing a recording method, Material_ID as an identifier for identifying material used in the existing image processing system, Sub Key representative whether or not contents are modified when edited, UMID (Data) for describing information relating to material data, UMID (System) representative of ID having UMID (Audio) and UMID (Video) collected, File Length which is represented by time of material, Essence_Size representative of size of the whole file, Object Type showing whether or not image date is a still picture, or voice data or image data, and Valid Date showing a valid date of material.

The metadata shown in FIGS. 4A and 4B, in addition that is recorded along with image data and voice data in the recording medium, are sometimes separated from image data and voice data, and administrated by the NCS 60.

The metadata and material data produced and recorded in the respective stages of the planning step 11, the acquisition step 21 and the ingest step 22 are used when rough editing and article preparation are accomplished by a journalist.

FIG. 5B illustrates metadata used and input when rough editing and article preparation are accomplished by a journalist. FIG. 5A shows metadata input mainly in the image pick-up device, and FIG. 5B shows metadata input mainly in the material acquisition step 22. In addition to these, new metadata are further input.

Gathering_Start_DateTime, Gathering_End_DateTime, Gathering_Location_Place, Photographer, Journalist Information, Director, Producer, Title, Contents, NCS ID, Gathering_Location_Latitude (GPD latitude), Gathering_Location_Longitude (GPS longitude), Gathering_Location_Altitude (GPS altitude), Gathering_Location_Time (GPS Time), Gathering_Location_Place (location name), machine ID, Camera Setup Information, Reel Number, Duration (Time), SOM, Good Shot Mark & REC Start Mark, Audio Channel Information, Audio Type, UMID (Audio), UMID (Video), Copyright, Source, STC, Format, compression ratio (Video Bit Rate), GOP Size, Resolution, Audio Channel number, Audio Compression, Audio Sampling Rate, Audio Date Size, REC_Type, Material_ID, Sub Key, UMID (Data), UMID (System), File Length, Essence_Size, Object Type, and Valid Date shown in FIG. 5A and FIG. 5B are input in the respective stages of the planning step 11, the acquisition step 21 and the material ingest step 22, these metadata being used in the rough editing. In addition to these data, there are metadata rewritten by the rough editing.

Metadata input newly in the stages of the rough editing and article preparation accomplished by a journalist include EDL (Editing Decision List) Information representative of information relating to editing contents, and Script having an article manuscript described.

In the complete edit step 32, based on the contents decided in the planning step 11, the complete edit is performed by using the materials from the voice over step 23 and the materials ingested in the recording server in the ingest step 22, and a news program image (hereinafter called broadcasting material) to be broadcasted eventually is prepared. Alternatively, there is a case in which the CG image prepared in the CG combination 15 and the material archived in the archive step 52 and the near line archive step 51 are used. FIGS. 6A and 6B illustrate metadata used in the real editing. FIG. 6A shows metadata input in the image pick-up device, and FIG. 6B shows metadata input in the ingest step 22. New metadata are further input in addition to the former. Or contents of metadata are rewritten.

Metadata of Gathering_Start_DateTime, Gathering_End_DateTime, Gathering_Location_Place, Photographer, Journalist Information, Director, Producer, Title, Contents, NCS ID, Gathering_Location_Latitude (GPD latitude), Gathering_Location_Longitude (GPS longitude), Gathering_Location_Altitude (GPS altitude), Gathering_Location_Time (GPS Time), Gathering_Location_Place (location name), machine ID, Camera Setup Information, Reel Number, Duration (Time), SOM, Good Shot Mark & REC Start Mark, Audio Channel Information, Audio Type, UMID (Audio), UMID (Video), Copyright, Source, STC, Format, compression ratio (Video Bit Rate), GOP Size, Resolution, Audio Channel number, Audio Compression, Audio Sampling Rate, Audio Date Size, REC_Type, Material_ID, Sub Key, UMID (Data), UMID (System), File Length (Time), Essence_Size (Byte), Object Type, and Valid Date, EDL Information, and Script are produced by the rough editing accomplished by the planning step 11, the acquisition step 21, the material ingest step 22 and the journalist, and or used. These metadata are used when editing of material is accomplished in the complete edit step 32.

There are also metadata rewritten by the complete editing out of metadata. In the complete edit step 32, metadata mainly representative of EDL Information and Script are rewritten according to the edited contents, and are decided with the rewritten contents.

Figure 7:
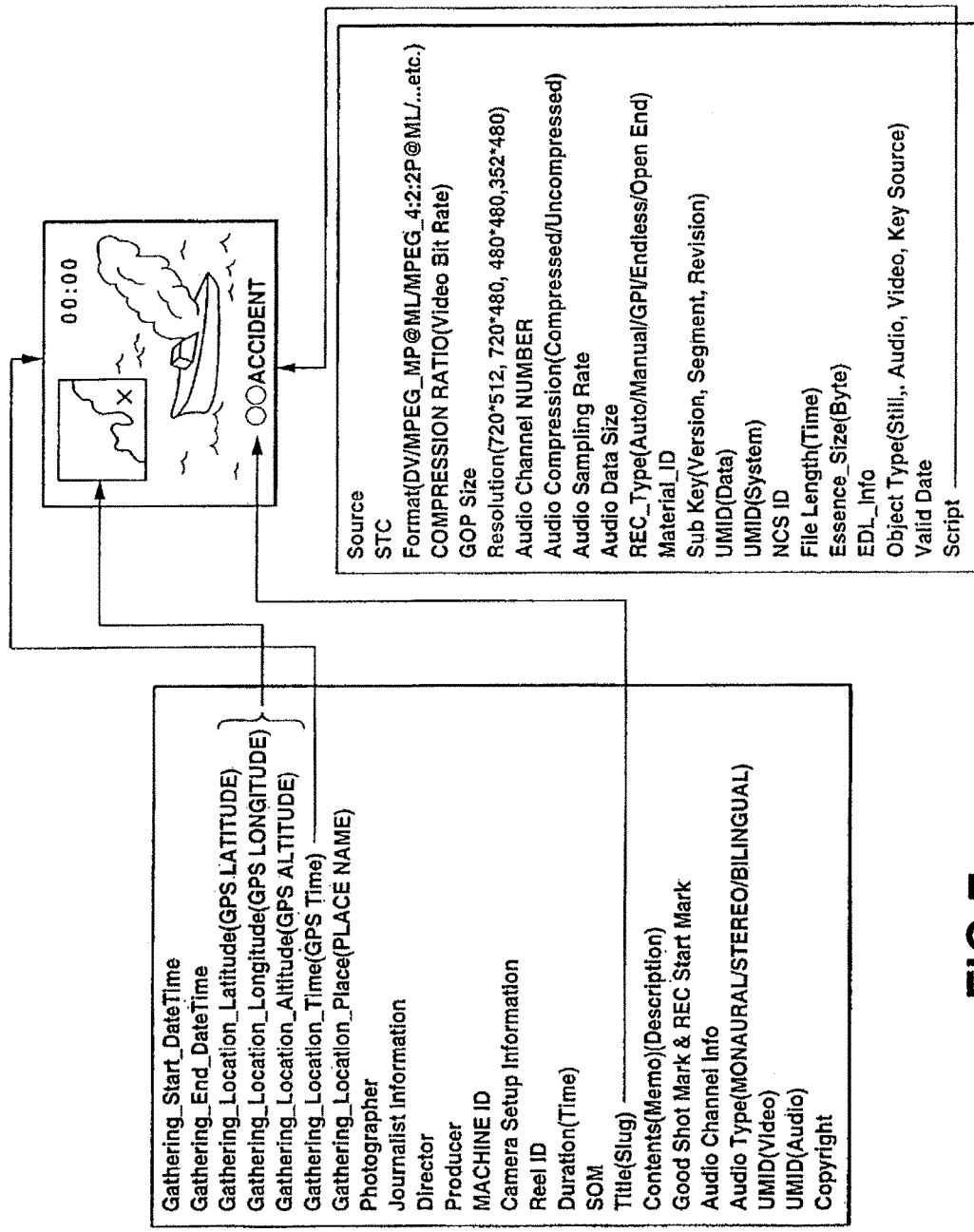
FIG. 7 is a view showing a concrete example of metadata used when a CG combined image plane is prepared automatically.

On the other hand, in the CG preparation step 31, a weather map, a map, and letters displayed being put on an image by computer graphics are prepared. At this time, the CG combined image plane is prepared automatically on the basis of metadata showing position information. This behaviour is shown in FIG. 7.

Metadata used include, for example, metadata showing position information such as Gathering_Location_Latitude (GPD latitude), Gathering_Location_Longitude (GPS longitude), Gathering_Location_Altitude (GPS altitude), Gathering_Location_Time (GPS Time) input by the image pick-up device in the acquisition 21 stage, and metadata such as Script and Title.

A map of area corresponding to position information is extracted automatically from a data base storing a map on the basis of metadata of Gathering_Location_Latitude (GPD latitude), Gathering_Location_Longitude (GPS longitude), Gathering_Location_Altitude (GPS altitude) recorded in material. Further, time is displayed automatically on the basis of Gathering_Location_Time (GPS Time).

The automatically prepared CG combined image plane can be edited freely by an editor in the CG combined GUI (Graphical User Interface) for editing.

In the next automation step 43, in addition to an image edited, a closed caption produced in the closed caption step 41, a CG combined image plane, image data broadcast to which a relay image from the live 42 is added, voice data and metadata are combined.

Metadata combined with an image and voice data and delivered are metadata produced and or used in the planning step 11, the acquisition step 21, the ingest step 22, the rough editing by a journalist, and the complete edit step 32.

Particularly, there can be mentioned Gathering_Start_DateTime, Gathering_End_DateTime, Gathering_Location_Place, Photographer, Journalist Information, Director, Producer, Title, Contents, NCS ID, Gathering_Location_Latitude (GPD latitude), Gathering_Location_Longitude (GPS longitude), Gathering_Location_Altitude (GPS altitude), Gathering_Location_Time (GPS Time), Gathering_Location_Place (location name), machine ID, Camera Setup Information, Reel Number, Duration (Time), SOM, Good Shot Mark & REC Start Mark, Audio Channel Information, Audio Type, UMID (Audio), UMID (Video), and Copyright. Metadata required for a viewer who receives broadcasting material can be extracted out of Source, STC, Format, compression ratio (Video Bit Rate), GOP Size, Resolution, Audio Channel number, Audio Compression, Audio Sampling Rate, Audio Date Size, REC_Type, Material_ID, Sub Key, UMID (Data), UMID (System), File Length (Time), Essence_Size (Byte), Object Type, and Valid Date, EDL Information, and Script, and transmitted.

A news program combined in the automation step 43 is broadcast (on-air) in the distribution 40.

Image data, voice data and metadata after on-air are subjected to near line archive for a given period in the stage of the near line archive step 51, and thereafter archived for a long period in the stage of the archive step 52. Material archived is suitably extracted from a recording device for archive for use.

At this time, additional information of material described as metadata is used as an identifier peculiar to material for identifying material. Further, by referring to additional information input as metadata, for example, an editor or a journalist is able to retrieve desired material immediately.

The image processing system for carrying out image processing will be described in detail using FIG. 8 on the basis of a flow of work as described above. The image processing system 1 comprises devices for carrying out gathering, editing and archives of material (image and voice), and in the processing steps of the devices, additional information for identifying material in detail is input in a recording medium or an exclusive-use recording server. Hereupon, particularly, a case where a news program is produced is shown.

The image processing system 1 comprises an image pick-up device 101 for recording an image and voice in a recording medium as image data and voice data, a portable telephone 102 for inputting additional information through a base station described later to transmit it to the image pick-up device 101, a data administrative device 103 for transmitting additional information to the base station, and a base station 104 for relaying data transmitted from the data administrative device 103 to the portable telephone 102.

Further, the image processing system 1 comprises a recording medium casing 10 housing a recording medium therein for recording and or reproducing image data and voice data, a recording/reproducing device 106 for reproducing data recorded in the recording medium, a monitor 107 for displaying images or the like operated and reproduced in the recording/reproducing device 106, a material accumulation device 108 for temporarily accumulating reproduced image data and voice data, an editing device for editing material, and a monitor 110 for displaying operating and editing images in the editing device 109.

Further, the image processing system 1 comprises a joint administrative device 111 for carrying out material administration in the system, a press terminal 112 in which a journalist inputs information with respect to material, and an input/output terminal 113 connected to the other network to carry out input/output of information.

The image processing system 1 comprises a recording device for archive for archiving broadcasting material produced, an authoring terminal 115 for producing and adding information irrespective of a time axis of broadcasting material, a media caster 116 for adding data for distribution for distributing information produced by the authoring terminal 115, a multiplexer 117 for mixing broadcasting material edited by the editing device 109, information irrespective of time axis and data for distribution, a delivering image and voice recording device 118 for temporarily recording delivering broadcasting material, a delivery part 119 for delivering broadcasting material produced by the multiplexer 117, a set top box 120 for receiving broadcasting material delivered from the delivery part 119, and a television receiver (TV) for receiving and displaying broadcasting material.

Further, when photographing, accumulation, editing and archives of material out in the image pick-up device 101, the material accumulation device 108, the editing device 109, and the recording device for archive 114, respectively, the image processing system 1 records metadata showing identification information of material together with image data and voice data (hereinafter referred to as material data) to thereby enable clear identification of material.

FIGS. 9 to 11 show concrete examples of metadata input as additional information. FIGS. 9 to 11 show them in a divided form for convenience' sake, but these are a series of figures.

In FIGS. 9 to 11, periods shown as symbols "F", "T", "Sh", "Sc", "M", and "P" represents modified periods of metadata. That is, "F" (Frame) is metadata modified in one frame period of an image photographed continuously every 1/30 second. "T" (Take) is metadata modified every take. "Sh" (Shot) is metadata modified in a shot period. "Se" (Scene) is metadata modified in a scene period. "M" (Media) is metadata decided every recording medium. "P" (Project) is metadata decided every news program.

In addition, FIGS. 9 to 11 show Japanese notation and English notation for explaining metadata. Further, metadata provided already by SMITE (Society of Motion Picture and Television Engineers, Inc.) show actual values such as "07 01 05 02 04 00 00 00" in a column of SMITE Dictionary.

Metadata shown in FIGS. 9 to 11 will be explained in detail. Gathering_Location_Latitude is metadata representative of latitude detected by GPS (Global Positioning System). Gathering_Location_Longitude is metadata representative of longitude detected by GPS. Gathering_Location_Altitude is metadata representative of altitude detected by GPS. Gathering_Location_Time is metadata representative of time detected by GPS. Position information by GPS is suitably generated from a GPS receiving part 138 provided on an image pick-up device 101. Further, time information detected by GPS is expressed by UTC (Coordinated Universal Time; adjusted Greenwich mean time) and includes Time Zone information representative of a time difference from UTC. For example, in Japan, since a time difference from UTC is 9 hours, information showing +9 is included.

Gathering_Location_Place is metadata representative of a location name of a gathering place.

UMID (Audio) and UMID (Video) are ID decided to be alone in the whole world for identifying material. Details of UMID will be described later.

UMID (Data) is metadata for describing information relating to material data, but is ID representative if image data is a still picture, or graphic, or a closed caption signal, and representative if voice data is MIDI (Musical Instrument Digital Interface).

UMID (System) is ID in which UMID (Audio) and UMID (Video) to a material are collected.

Photographer is metadata representative of a name of a photographer. Journalist Information is metadata into which is written information relating to a journalist in charge of gathering. Director is metadata representative of a director of a news program.

Good Shot Mark & REC Start Mark is metadata relating to a mark point input manually at the time of photographing.

Camera Setup Information is metadata including, for example, set information of CCD (Charge Coupled Device) provided by an image pick-up device, lens data for describing a lens maker, a contraction value and a lens magnification, and a crane angle. Camera Setup Information is necessary particularly in the stage of CG combination 15.

Machine ID is metadata representative of an image pick-up device used for gathering, and has an identification number peculiar to every image pick-up device.

Take Number is metadata modified in a take period.

Material start time code (Start of Materia) is metadata showing start time of each scene.

Contents are metadata into which is input other information relating to photographing contents.

Valid Date is metadata showing a valid date of material.

Audio Channel Information is metadata showing microphone channel information. In Audio Channel Information are described microphone information, for example, such that 1 channel is assigned to a reporter microphone, and that 2 channel is assigned to a mating microphone.

Audio Type is metadata showing if recording of voice is monophonic, stereo, or bilingual.

Source is metadata representative of a supply source of image data if material supplied to a recording server is recorded in a recording medium and carried into a broadcasting station directly, or is transmitted from a gathering location by a satellite communication or a wireless communication, or is distributed from other broadcasting stations.

Format is metadata showing a type of data stream if it is DV format, or MPEG MP@ML format, or MPEG 4:2P@ML format.

Video Bit Rate is metadata showing a compression ratio of image.

Audio Number of Channel is metadata representative of a channel number of audio data. Audio Compression is metadata representative if audio data is compressed.

Audio Compression is metadata representative of a compression ratio of audio data.

Audio Sampling Rate is metadata representative of audio sampling frequency.

Audio Date Size is metadata in which size of audio data is displayed by time or byte number.

REC_Type is metadata showing a recording method such as Auto, Manual, GPI, Endless, Open End, etc.

Material_ID is ID for identifying material used in the existing image processing system. That is, Material_ID corresponds to UMID, and is not sometimes described.

Sub Key is metadata showing Version, Segment, Revision, etc., and shows if it is deformed during application of several edits with respect to material.

File Length (Time) is metadata in which length of material is expressed by time.

Gathering_Start_DateTime is metadata representative of time starring photographing, and is expressed by UTC. Gathering_End_DateTime is likewise expressed by UTC, and is metadata representative of photographing end time. These time data include Time Zone information representative a time difference from UTC.

REC_Start_DateTime is metadata in which editing start time when broadcasting material is produced in the editing device 10 is expressed by UTC. REC_End_DateTime is metadata in which termination time of editing is expressed by UTC. These time information include Time Zone information representative of a time difference from UTC.

Recording Operator is metadata representative of information of an operator who carried out editing in the editing device 109.

File_Owner is metadata representative of property right information of material data.

Shot Number is metadata modified in a shot period.

Duration (Time) is metadata showing time required for photographing.

GOP Size is metadata showing, in a case where an image is compressed by the MPEG type, its compression ratio.

Resolution is metadata representative of resolutions such as 720*512, 720*480, 544*480, 480*480, and 352*480.

Essence_Size (Byte) is metadata in which size of the whole file including image and voice data is expressed y the byte number, that being sometimes expressed by time.

Object Type (Still, Audio, Video, Key Source) is metadata including data such as Still showing if image data is a still picture, Audio and Video showing if it is audio data or video data, and Key showing Key Source showing indication for a telop.

Index, Index Type, Index Memo is metadata for carrying out retrieving.

Scene Number is metadata modified in a scene period.

Recording Terminal, RECPort is metadata representative of information relating to a terminal that carried out recording.

Reel Number is metadata for identifying a recording medium in which image data is recorded, which is produced, even the same tape, as Number which is different every time it is moved in and out of an image pick-up device.

Copyright is metadata showing copyright of image data photographed and recorded, into which are input an individual name or a broadcasting station name.

Modified_DateTime is metadata showing date in which modification is added to broadcasting material edited in the editing device 109; OnAir_DateTime is metadata showing date on which broadcasting material is on-aired; and Archive_DateTime is metadata showing date on which broadcasting material is archived. These are expressed by UTC including Time Zone information.

Producer is metadata representative of a producer for a news program.

Archive_Operator is metadata representative of information of an operator who carried out archiving of broadcasting material.

Title is metadata representative of a program name using a photographing title or contents to be gathered (contents of material).

Archive Terminal is metadata representative of information relating to a terminal that carried out archiving of broadcasting material.

NCS ID is ID (Identifier) set every news program item and program registered in NCS (Newsroom Computer System). However, NCS ID does not show ID for getting access to NCS 60.

EDLInformation is metadata relating to editing contents. Concretely, an in-point and an out-point of image data used are shown by time or Reel Number, and are described as an editing point list. Further, Script is metadata mainly showing contents of a read original.

OnAir_Flag is metadata representative whether or not the edited broadcasting material is on-aired; and OnAir_Counter is metadata representative how many times on-air is made.

Archive_Flag is metadata representative whether or not material collected by gathering is archived.

Compile_Flag is metadata representative of that material once archived is recorded again when the former is arranged again and process whether or not it is erased is carried out.

Distribution_Flag is metadata representative whether or not broadcasting material is delivered from a broadcasting station other than own station. Also when buying and selling of material is carried out, its information is described.

File_Status_Bit is metadata representative of status of material in the material accumulation device 108 and the editing device 109.

The metadata as described above are input in the processing steps in the respective devices whereby material can be identified clearly by additional information showing status of material.

Figures 12A, 12B:
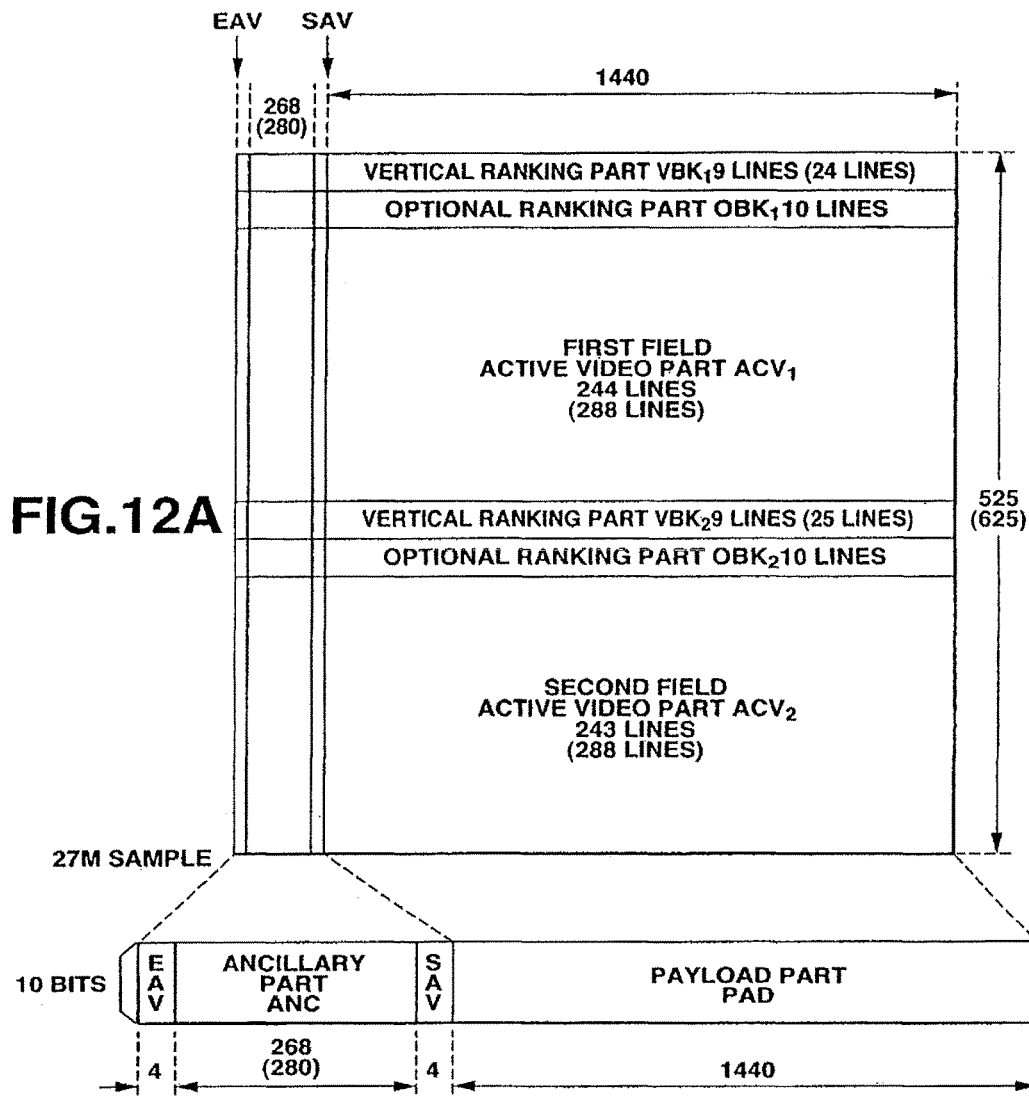
FIG. 12A is a schematic view for explaining a SDI format used as a data transmission format of an image processing system shown as one constitutional example of the present invention.
FIG. 12B is a schematic view for explaining one line of the SDI format.

As a transmission format for transmitting image data, voice data and metadata in the image processing system 1, there is used SDI (Serial Digital Interface) which is a digital data transmission format standardized by SMPTE (Society of Motion Picture and Television Engineer, Inc.). FIG. 12A shows the constitution of the whole SDI format data.

The SDI format has EAV (End of Video) region of 4-dit showing end synchronism, ancillary (ANS) region of 268-dot, SAV (Start of Video) region of 4-dot showing start synchronism, and an active video region of 1440-bit, which is constituted by line number 525. However, numeral in a parentheses indicates a value defined by PAL (Phase Alternation Line) system.

The active video region has a vertical blanking part ($VBK_1$) of 9 lines, an optional blanking part ($OBK_1$) of 10 lines, an active video part ($OCV_1$), a vertical blanking part ($VBK_2$) of 9 lines, an optional blanking part ($OBK_2$) of 10 lines, and an active video region ($ACV_2$).

SDI is a so-called DI format, which is a format for transmitting non-compression digital data such as D2 format, in which voice data is stored in the ancillary region, and video data such as D1 and D2 are stored in the active video region for transmission. In the SDI format, metadata is inserted into the ancillary region and transmitted.

FIG. 12B shows 1 line of the SDI format. When transmitted, data of 1 line 10-bit width is subjected to parallel-serial conversion and transmission path coding and transmitted.

Further, as a transmission format for transmitting image data, voice data, and metadata in the image processing system 1, there may be used, in addition to the aforementioned SDI format, SDTI (Serial Digital Transfer Interface) format for transmitting compression data compressed by MPEG system or DV system, and SDTI-CP (Serial Digital Transfer Interface—Content Package) format in which the SDTI format is further limited.

Figure 13A:
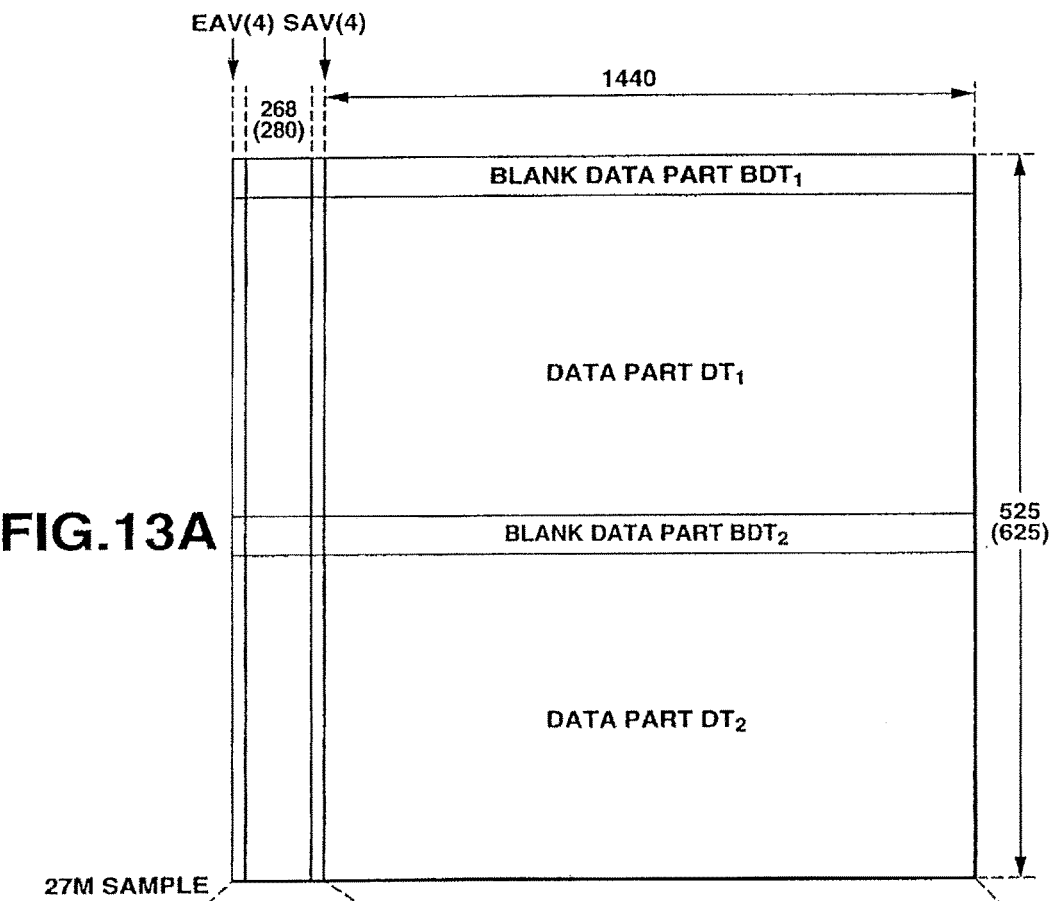
FIG. 13A is a schematic view for explaining a data construction of a SDI format used as a data transmission format of an image processing system shown as one constitutional example of the present invention.

FIG. 13A shows the data construction of the SDTI format. The SDTI format has, similar to the SDI format, EAV (End of Video) region of 4-dit showing end synchronism, ancillary (ANS) region of 268-dot, and SAV (Start of Video) region of 4-dot showing start synchronism, but the active video region constituted by line number 525 in the SDI format is defined as a payload region. However, a numeral in a parentheses shows a value defined by PAL (Phase Alternation Line).

The payload region in the SDTI format has a blank data part ($BDT_1$, $BDT_2$) and data part ($DT_1$, $DT_2$) but the line number of each data part is not defined.

Figure 13B:
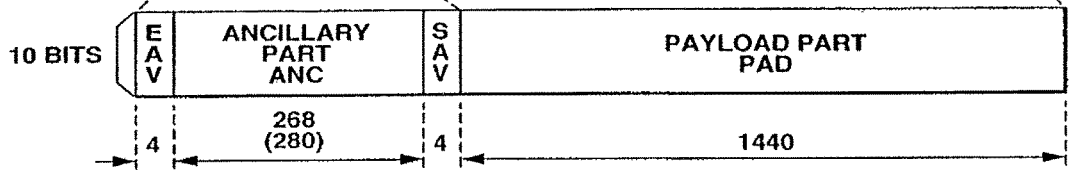
FIG. 13B is a schematic view for explaining one line of the SDI format.

FIG. 13B shows 1 line of the SDTI format. When transmitted by the SDTI format, data of 1 line 10-bit width is subjected to parallel-serial conversion and transmission path coding and transmitted.

In the SDTI format, SDTI header data of 53 words into which a transmission source address, an address, and a line number CRC are inserted are contained in the ancillary region. In the SDTI format, metadata is inserted into a region of a portion except SDTI header data of the ancillary region.

Figure 14:
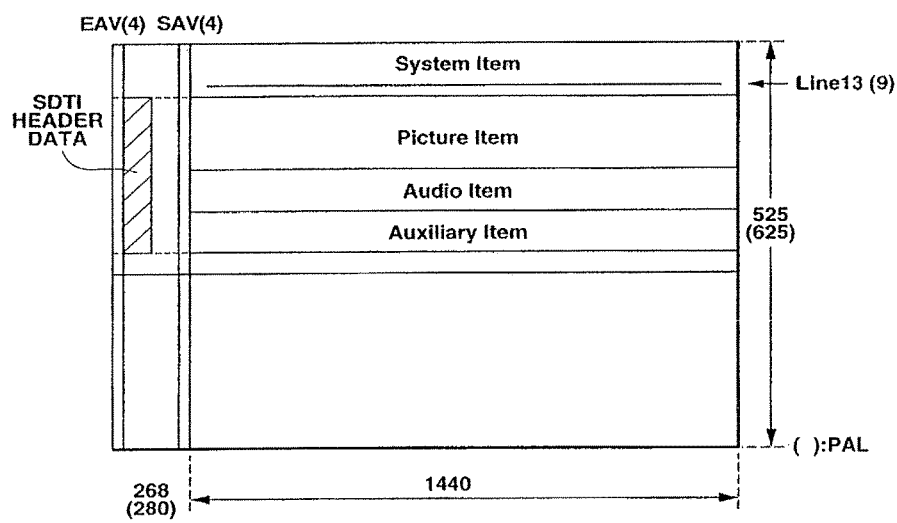
FIG. 14 is a schematic view for explaining a SDTI-CP format used as a data transmission format of an image processing system shown as one constitutional example of the present invention.

FIG. 14 shows the data construction of a SDTI-CP format. The packet construction in SDTI-CP is composed by further limiting the SDTI format, in which the constitution of the payload is modified so that various data may be inserted easily.

Data transmitted by the SDTI-CP format includes MPEG (Moving picture Expert Group) 2 Video Elementary Stream and the like, and various data such as auxiliary data including voice and metadata can be transmitted collectively.

Data inserted into the payload are divided by "items", and various data are inserted into the items. Concretely, there are four items, System Item, Picture Item, Audio Item, and Auxiliary Item.

The System Item has regions such as System Item Bitmap, Content Package rate, SMPTE Universal Label, Package Metadata Set, Picture Metadata Set, Audio Metadata Set, Auxiliary Metadata Set, etc.

In the SDTI-CP format, metadata are regions of Package Metadata Set, Picture Metadata Set, Audio Metadata Set, and Auxiliary Metadata Set of System Item and transmitted.

Metadata are proper data added to identify material such as image data and voice data, and are transmitted on the basis of data format of KLV (Key Length Value) protocol and UMID (Unique Material Identifier) based on the SMPTE Standard.

Figure 15:
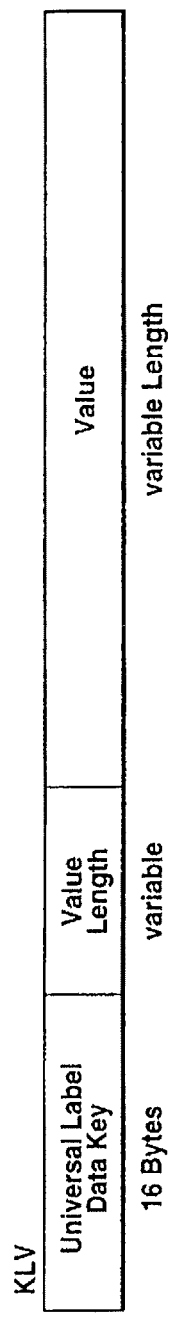
FIG. 15 is a schematic view for explaining a KLV format of an image processing system shown as one constitutional example of the present invention.

The KLV format is a data transmission format provided with three regions, Universal Label Data Key of 16 bytes describing Universal Label Data, Value Length showing data length of metadata stored in a Value region, and Value in which actual metadata corresponding to SMPTE Dictionary. FIG. 15 shows the KEV format.

The Universal Label Data Key is a data region for applying proper labelling to metadata stored. The Universal Label Data Key is further divided into a UL (Universal Label) Header region including Object ID of 1 byte and UL (Universal Label) Size, a UL (Universal Label) Designators region including SMITE Design, Registry Design, Data Design and Reference Version, and a Data Element Tag region of 9 bytes.

Figure 16:
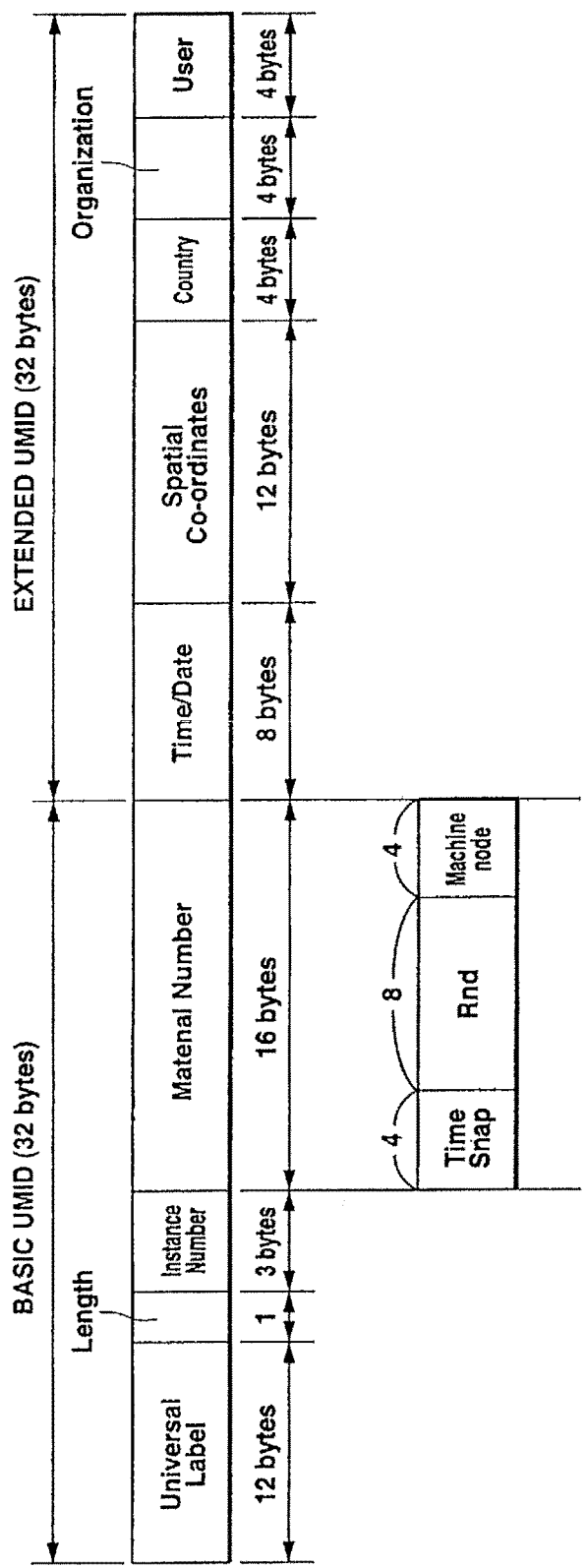
FIG. 16 is a schematic view for explaining a format of UMID used as a data transmission format of an image processing system shown as one constitutional example of the present invention.

UMID is an identifier decided solely in order to identify image data, audio (voice) data and other material data. FIG. 16 shows the data construction of UMID.

UMID is composed of Basic UMID as ID for identifying material data comprising a series of image, voice and metadata (hereinafter referred to as contents), and Extended UMID as a signature for identifying contents in material data.

Basic UMID has a data region of 32 bytes, and is composed of a Universal Label region of 12 bytes, a Length Value region of 1 byte, an Instant Number region of 3 bytes, and a Material Number region shown by 16 bytes.

The Universal Label region stores therein a symbol for identifying digital data, details of which are standardized in SMITE-298M. The Length Value region shows length of UMID. Basic UMID is different in length of symbol from Extended UMID. The Length Value region is shown, in case of Basic UMID, by 13$h$, and is shown, in case of Extended UMID, by 33$h$. The Instant Number region shows whether or not substitute process and editing process to material data are applied. The Material Number region has three regions and stores therein a symbol for dividing material data.

Time Snap shown by 4 bytes shows a snap clock sample number a day, and shows preparing time of material data in clock unit. Rn (Random Number) of 8 bytes is a random number for avoiding that a double number is attached, in a case where inaccurate time is set, or in a case where for example, a network address of equipment defined by IEEE (The Institute of Electrical and Electronics Engineer, Inc.) is changed.

On the other hand, Extended UMID is composed of Time/Date Code of 8 bytes for identifying time and data by which material is produced, Spatial Co-ordinates of 12 byes defining position information expressed by latitude, longitude and altitude, Alphanumeric Code (Country) of byte defining country name 4 by letters of alphabet omitted or symbols, Alphanumeric Code (Organization) of 4 bytes defining an organization name by letters of alphabet omitted or symbols, and Alphanumeric Code (User) of 4 bytes defining a user name that produced material.

The above-descried Basic UMID and Extended UMID include no metadata showing image size and generation number. Particularly, Material Number shows no status of material and other information relating to an image of material. Metadata showing image size and generation number are transmitted on the basis of the KEV format.

Figure 17:
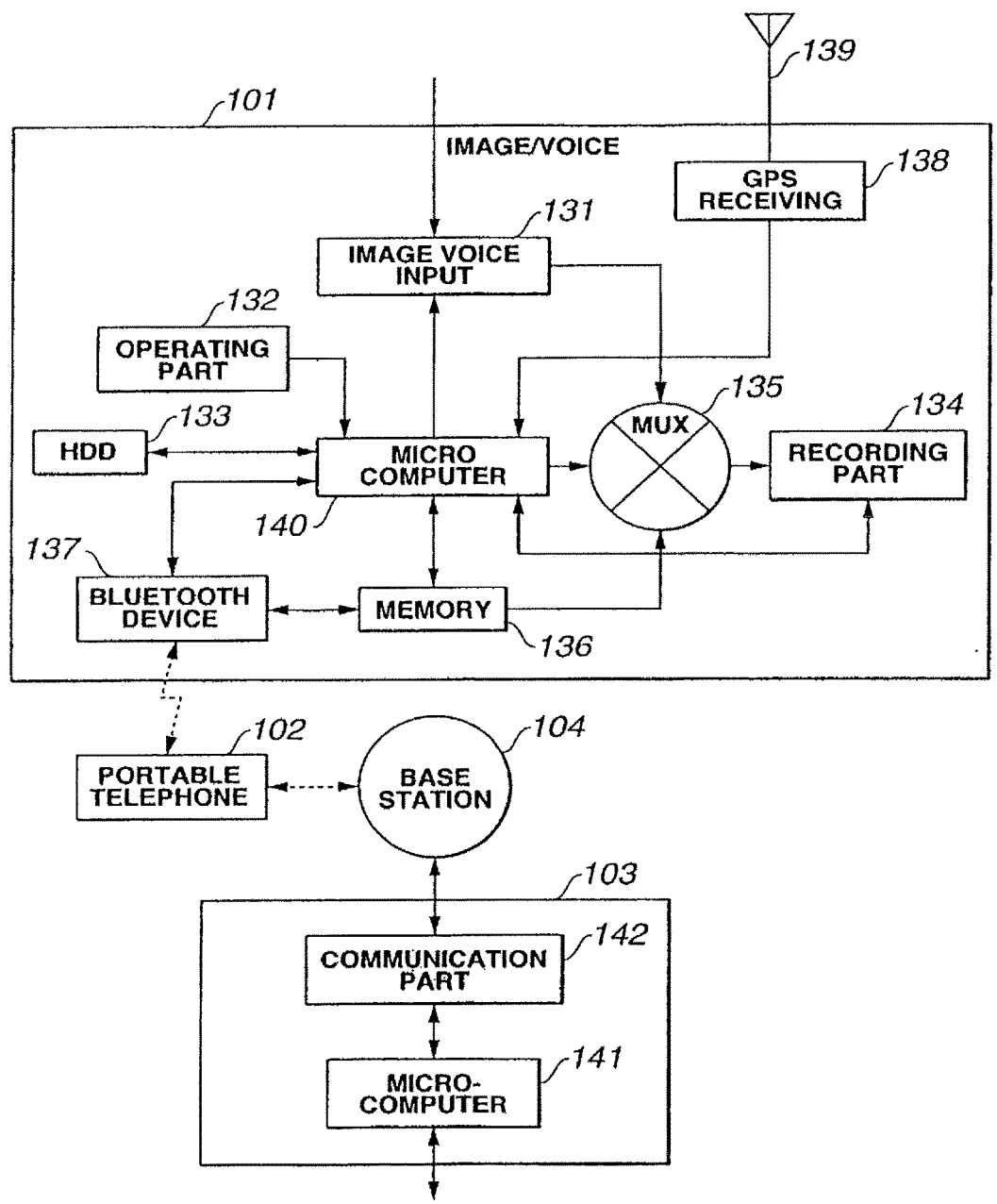
FIG. 17 is a block diagram showing a concrete constitution of an image pick-up device, a base station, and a data administrative device of an image processing system shown as one constitutional example of the present invention.

The image pick-up device 101, the portable telephone 102, the data administrative device 103, and the base station 104 will be explained in detail with reference to FIG. 17.

The image pick-up device 101 receives metadata through the base station 104 and the portable telephone 102 from the data administrative device 103 connected to the material administrative device 108. Accordingly, the transfer of data between these devices corresponds to the case where the image pick-up device 101 moving in the course of shifting to the gathering 12 from the planning step 11 in FIG. 1 transmits metadata from the broadcasting station.

The image pick-up device 101 is a digital video camera, comprising at least an image voice input part 131 for inputting image and voice, an operating part 132 for carrying out operation of the image pick-up device 101 and inputting of metadata, HDD (Hard disk Drive) 133 in which OS (Operating System) of a microcomputer 140 described later is recorded, a recording part 134 for recording at least an image and voice with respect to the recording medium 105, a multiplexer 135 for multiplexing an image and voice and other data, a memory 136 for mainly storing metadata, a bluetooth device 137 as a wireless interface relative to the portable telephone 102, a GPS receiving part 138 for receiving a GPS (Global Positioning System) signal to detect position information, an antenna 139 for receiving the GPS signal, and a microcomputer 140 for summing up and controlling the aforementioned constitution.

The image voice input part 131 has a circuit for image picking-up in CCD (Charge Coupled Device) not shown, or a circuit for recording such as a microphone, in which the image and voice input are converted into image data and voice data on the basis of instructions from the microcomputer 140 to supply them to the multiplexer 135.

The operating part 132 has various buttons and switches not shown and carries out operation with respect to the image pick-up device 101. Further, metadata is input as necessary.

In HDD 133 are recorded OS (Operating System) of the microcomputer 140, and a software for controlling the portable telephone 102, and the microcomputer 140 suitably read these data for use. Further, In HDD 133, data is written by the microcomputer 140.

The recording part 134 has a recording/reproducing head for recording and or reproducing image data, voice data and metadata in a recording medium though not shown, and records image data being controlled by the microcomputer 140 and supplied from the multiplexer 135 in the recording medium. Further, the recording part 134 detects metadata described in the recording medium on the basis of instructions from the microcomputer 140 to supply it to the microcomputer 140.

The multiplexer 135 is controlled by the microcomputer 140 and multiplexes image data supplied from the image voice input part 131 and metadata supplied from the microcomputer 140 to supply them to the recording part 134.

The memory 136 is a so-called EPROM (Erasable and Programmable ROM) which is erasable and programmable, which stores metadata supplied from the data administrative device 103 on the basis of instructions from the microcomputer 140. Further, the memory 136 supplies metadata stored to the multiplexer 135 on the basis of the instructions from the microcomputer 140.

The bluetooth device 137 is used as a wireless interface relative to the portable telephone 102, and is controlled by the microcomputer 140 to receive metadata supplied from the data administrative device through the portable telephone 102. Further, the bluetooth device 137 supplies tape position information output from the microcomputer 140 to the data administrative device through the portable telephone 102.

The bluetooth termed herein is a short distance wireless communication using a radio wave in 2.4 GHz band provided by Ericsson Ltd. (Sweden). The maximum transfer speed of the bluetooth is 1 Mbit/sec., and as the modulation system, GFSK (Gaussian Frequency Shift Keying) is used. Further, the maximum transfer distance of the bluetooth is 10 m (output: 1 mW) and 100 m (output: 100 mW), and the maximum transfer distance depends upon uses.

The GPS receiving part 138 receives a GPS signal through the antenna 139 to detect position information of the image pick-up device 101. The position information is expressed as latitude, longitude and altitude.

The microcomputer 140 houses therein, though not shown, CPU (Central Processing Unit), RAM (Random-Access Memory), and ROM (Read Only Memory) to sum up and control the above-described constitutions and to control operation of the whole digital video camera corresponding to a signal from the operating part 132. Various metadata relating to photographing are produced.

On the other hand, the data administrative device 103 is a computer connected, for example, to a telephone line network to enable communication with the joint administrative device 111, and is installed, for example, in a broadcasting station to which a photographer who uses the image pick-up device 101 to carry out photographing belongs. A microcomputer 141 provided on the data administrative device 103 sums up and controls the whole operation of the data administrative device 103. When the microcomputer 141 controls a communication part 142 and receives a signal from the image pick-up device 101 through the portable telephone 102, the microcomputer 141 identifies a telephone number of the portable telephone 102 to recognize the image pick-up device 101 being used by a photographer who owns the portable telephone 102 as a transmission source. The data administrative device 103 transmits metadata corresponding to the recognized image pick-up device 101 to the portable telephone 102.

Figure 8:
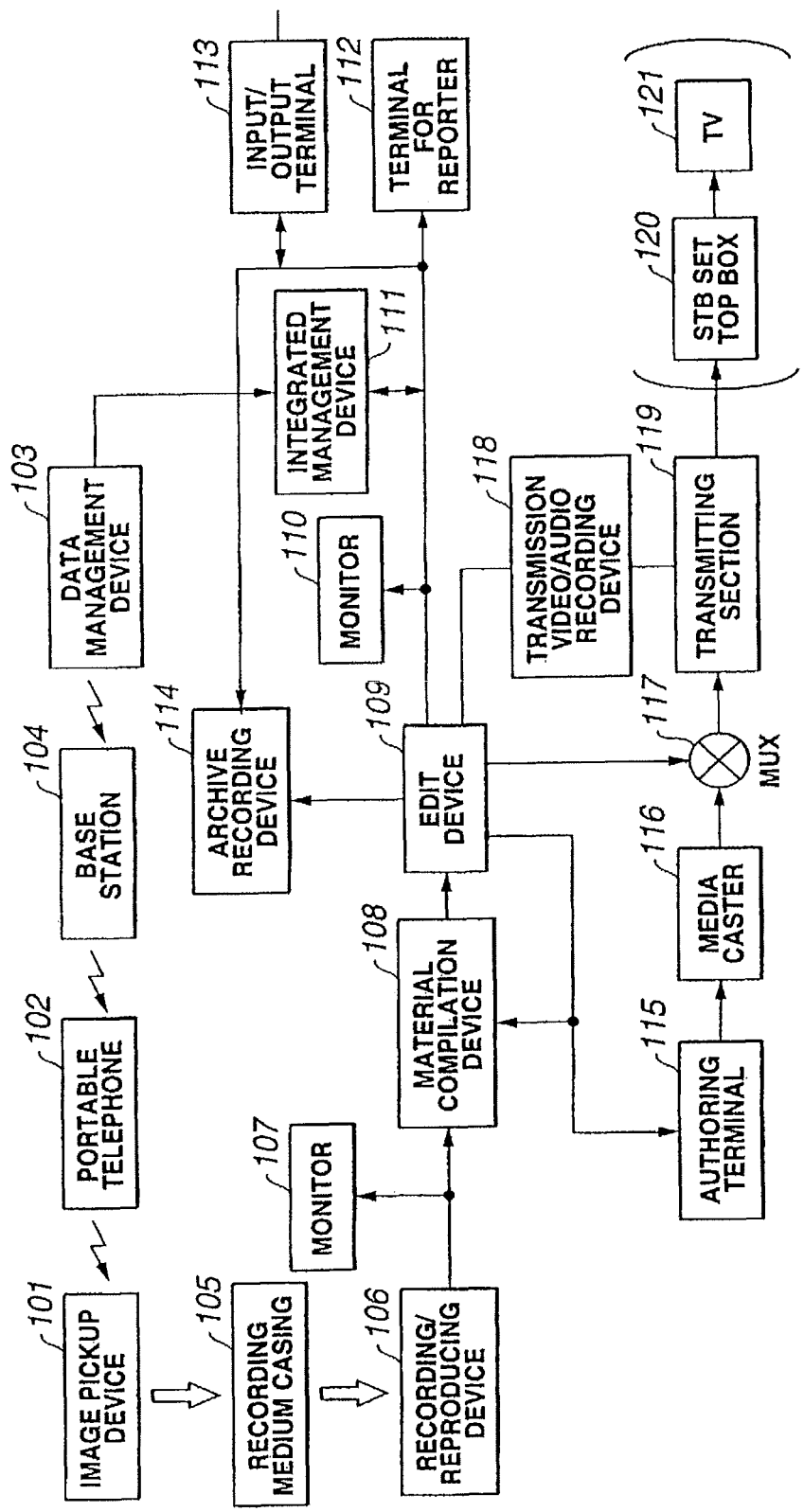
FIG. 8 is a block diagram showing a concrete constitution of an image processing system shown as one constitutional example of the present invention.

Metadata corresponding to the individual image pick-up device 101 transmitted are input in advance in the joint administrative device 111 shown in FIG. 8. The metadata are accumulated, for example, in HDD not shown provided in the joint administrative device 111.

Figure 18:
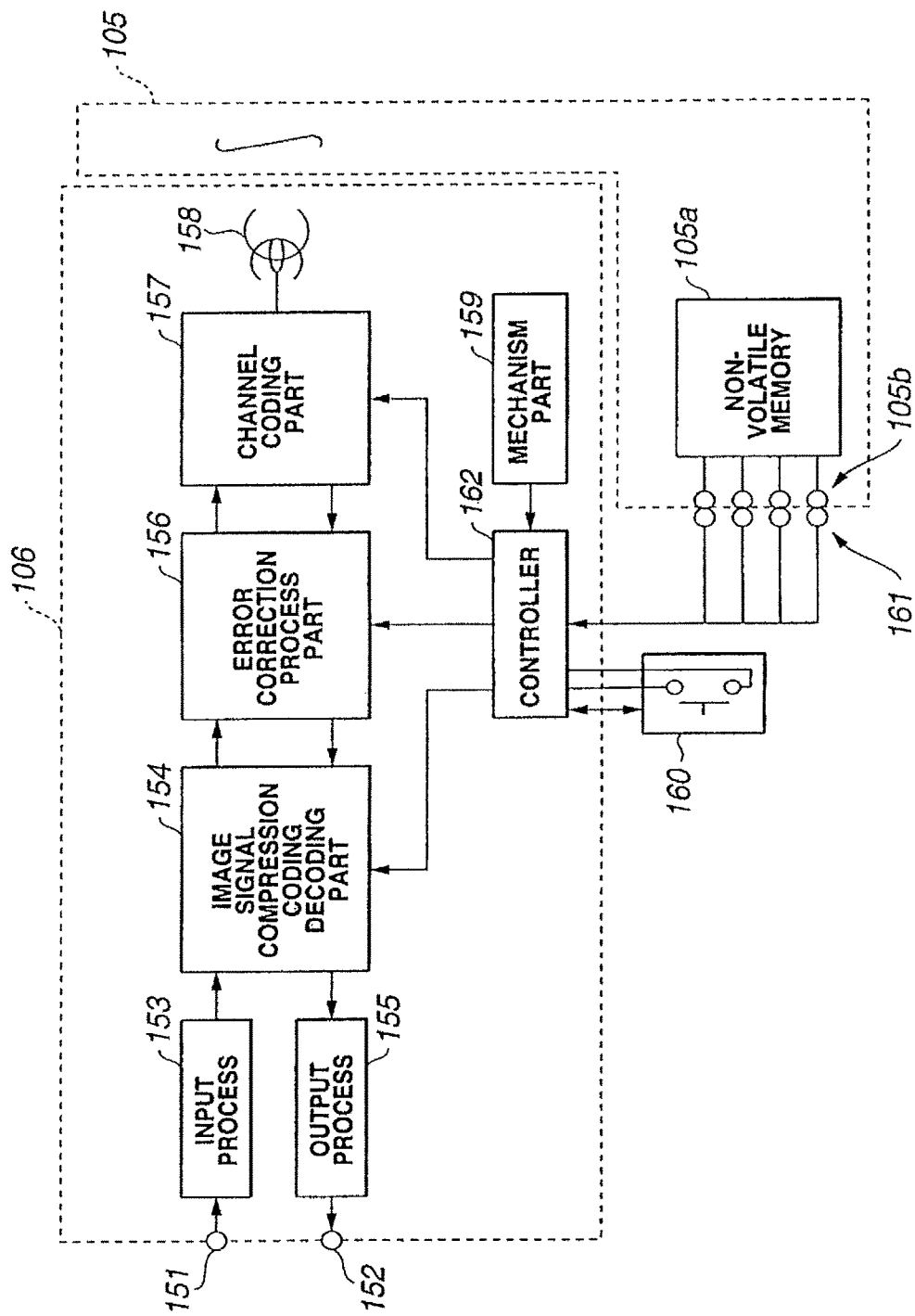
FIG. 18 is a block diagram showing a concrete constitution of a recording and reproducing device of an image processing system shown as one constitutional example of the present invention.

The recording/reproducing device 106 shown in FIG. 8 is a device capable of reproducing image data and voice data, and as a recording medium, particularly a digital video tape recorder is used. The constitution of the recording/reproducing device 106 will be explained with reference to FIG. 18.

The recording/reproducing device 106 comprises an input terminal 151 for inputting image data, voice data and metadata supplied in the SDI format, an output terminal 152 for outputting image data, voice data and metadata supplied in the SDI format, an input processing part 153 for extracting image data, voice data and metadata from data input in the SDI format; a compression coding/decoding part 154 for carrying out compression coding and decoding (expansion) process of data, and an output processing part 155 for converting a signal decoded in the compression coding/decoding part 154 into the SDI format to supply it to the output terminal 152. The compression coding/decoding part 154 carries out compression coding process using discrete cosine conversion.

The recording/reproducing device 106 further comprises an error correction process part 156, a channel coding part 157, and a recording/reproducing part 158. The error correction process part 156 carries out addition of an error correction code to a signal compression coded by the compression coding/decoding part 154, and carries out error correction process with respect to a signal obtained by reproducing from the recording medium to output it to the compression coding/decoding part 154. The channel coding part 157 carries out coding process suitable to be recorded in the recording medium with respect to a signal to which an error correction code is added by the error correction process part 156, and carries out decoding process corresponding to coding process with respect to an image signal reproduced from the recording medium to output it to the error correction process part 156. The recording/reproducing part 158 records a signal coded by the channel coding part 157 in the recording medium, and reproduces a signal recorded in the recording medium to output it to the channel coding part 157.

The recording/reproducing device 106 further comprises a mechanism part 159 for carrying out loading of the recording medium casing 105 and driving of a recording/reproducing part 158, an operating part 160 for carrying out various inputs from a user, a terminal 161 connected to a terminal 105b of a non-volatile memory 105a provided in the recording medium casing 105, and a controller 162. The controller 162 is connected to the compression coding/decoding part 154, the error correction processing part 156, the channel coding part 157, the mechanism part 159, the operating part 160 and the terminal 161.

In the recording/reproducing device 106, the operating part 160 is provided with a plurality of switches for carrying out predetermined instructions though not shown in detail. The plurality of switches include a switch for instructing a start point (a mark-in point) of a valid region in each scene or take, a switch for instructing OK, NG (No Good) to each scene or take, a disk switch for instructing a take number, and a switch for inputting other metadata.

The controller 162 in the recording/reproducing device 106 is composed of CPU (Central Processing Unit), ROM (Read Only Memory), RAM (Random Access Memory), and input/output part though not shown, and executes a program stored in ROM with RAM as a work region to thereby sum up and control the whole work of the recording/reproducing device 106 on the basis of a time code signal.

In the above-described recording/reproducing device 106, when image data recorded in the recording medium is reproduced, or when image data reproduced is recorded in the material accumulation device 108, identification information such as a mark-in point, a mark-out point, and other metadata can be input as necessary by the operation from the operating part 160. The identification information is recorded in the non-volatile memory 105a and the recording medium together with image data.

Figure 19:
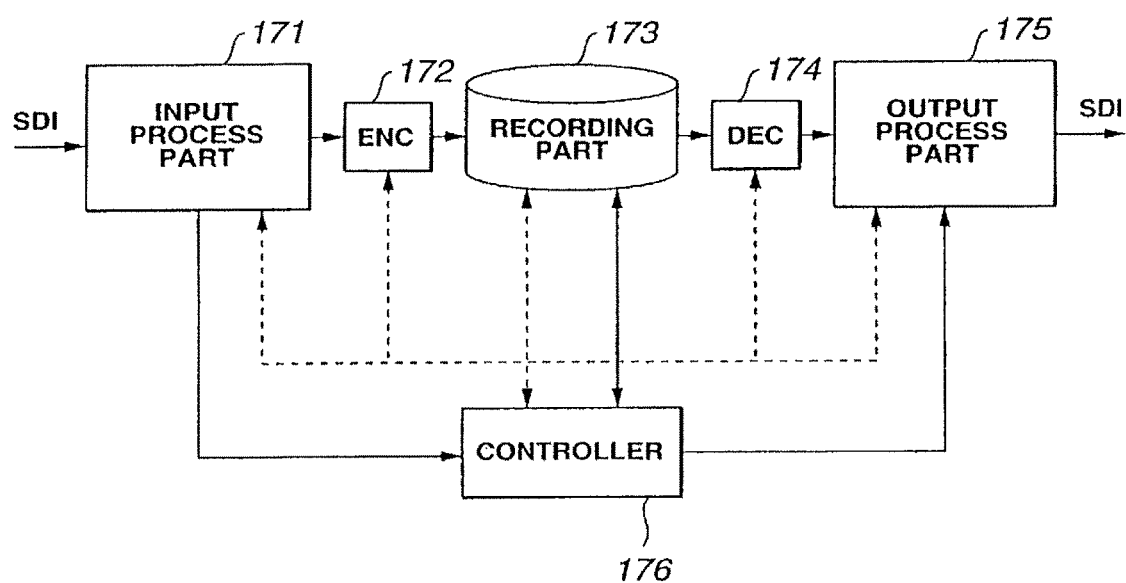
FIG. 19 is a block diagram showing a concrete constitution of a material accumulation device of an image processing system shown as one constitutional example of the present invention.

The material accumulation device 108 shown in FIG. 8 is a memory for temporarily accumulating additional information such as image data, voice data and metadata reproduced from the recording/reproducing device 106. The constitution of the material accumulation device 108 will be explained with reference to FIG. 19. In FIG. 19, the solid line indicates that image data, voice data and metadata are transmitted, and the broken line indicates a control signal.

The material accumulation device 108 comprises an input process part 171 for inputting and separating image data, voice data and metadata transmitted in the SDI format, an encoder (ENC) 172 for coding image data and voice data, a recording part 173 for recording additional information of image data, voice data and metadata, a decoder (DEC) for carrying out decoding corresponding to the encoder, an output process part 175 for outputting the decoded image data, voice data and metadata in the SDI format, and a controller 170 for summing up and controlling various parts.

The input process part 171 extracts image data, voice data and metadata from data input in the SDI format-being controlled by the controller 176, and supplies image data and voice data to the encoder 172. The extracted metadata is supplied to the controller.

The encoder 172 is controlled by the controller 176 to code image data and voice data input from the input process part 171 on the basis of a MPEG system for compressing relatively between frames or a DV, JPEG system for compressing in a frame to supply the obtained signal to the recording part 173.

The recording part 173 is a recording medium, for example, such as HDD (Hard Disk Drive), and records additional information such as image data, voice data and metadata. The recording part 173 inputs and records a compression stream coded in the encoder 172. Such a recording part 173 may have an A/V data recording part for recording A/V data (Audio/Video) data such as image data and voice data, and an addition information recording part for recording additional information such as metadata.

The decoder 174 is controlled by the controller 176 to apply decoding process corresponding to coding in the encoder 172 with respect to data coded in the encoder 172 to supply it to the output process part 175.

The output process part 175 is controlled by the controller 176 to input image data and voice data decoded in the decoder 174 and metadata from the controller 176 to convert the data into the SDI format to output it.

The controller 176 is composed of CPU, ROM, RAM, an input/output part, and a memory to execute a program stored in ROM with RAM as a work region whereby summing up and controlling the whole work of the material accumulation device 108. The controller 176 administrates metadata supplied from the input process part 171. The controller 176 modifies metadata as necessary or produces new metadata. Further, the controller 176 sends metadata to the output process part 175.

Figure 20:
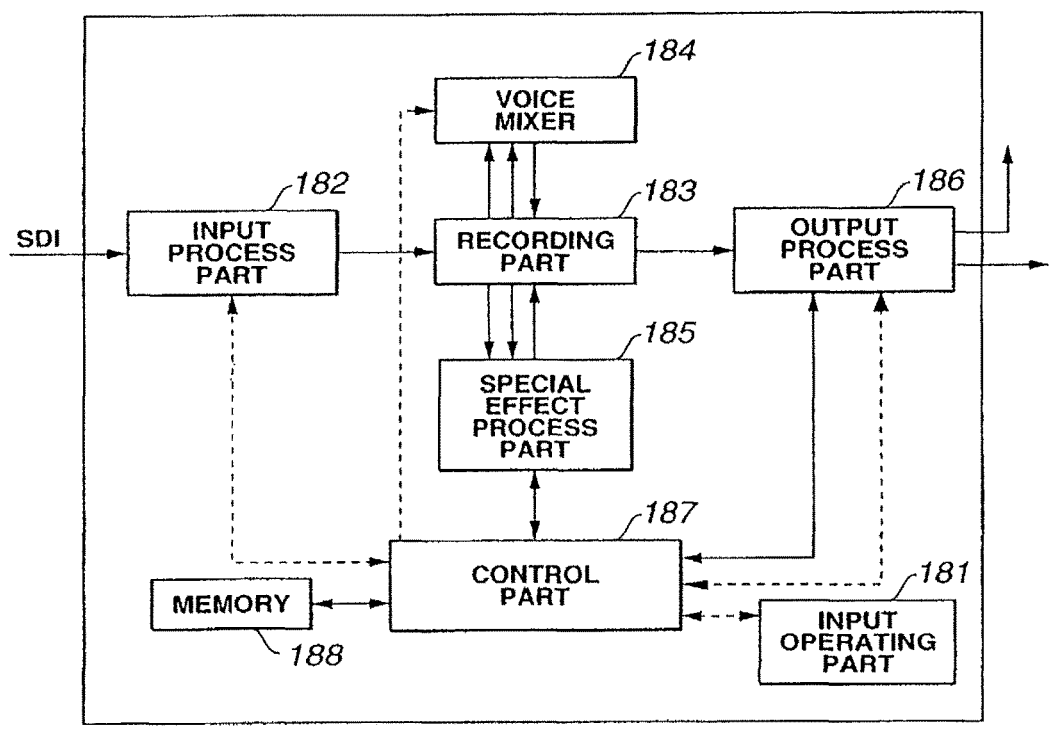
FIG. 20 is a block diagram showing a concrete constitution of an editing device of an image processing system shown as one constitutional example of the present invention.

The editing device 109 shown in FIG. 8 is an editing device for editing image data and voice data (material data) to edit material on the basis of metadata. The constitution of the editing device 109 will be explained with reference to FIG. 20.

The editing device 109 comprises an input operating part 181 for carrying out operating input for various editing, an input process part 182 for inputting material data transmitted in the SDI format, a recording part 183 for recording image data, voice data and metadata, a voice mixer 184 for processing voice data, a special effect process part 185 for applying special effect process to image data, an output process part 186 for outputting image data, voice data and metadata in the SDI format, a control part 187 for summing up and controlling various parts, a memory 188 for storing the edition result as metadata.

The input operating part 181 shows a mouse and a keyboard for editing material from GUI (Graphical User Interface) displayed on a monitor connected to the editing device 109. Operation for various editions, preparation of originals of articles, and edition of a CG combined image plane are carried out from the input operating part 181. The input operation is carried out by the input operating part 181, and in addition, can be also carried out from the joint administrative device 111 shown in FIG. 8.

The input process part 182 is controlled by the control part 187 to input data from the material accumulation device 108 transmitted in the SDI format standardized in SMPTE, and extracts image data, voice data and metadata to supply them to a recording part 183 described later. The image data and voice data out of the extracted data may be compressed in MPEG system making use of relations between frames or JPEG system and DV system which are compression in a frame in the compression process part not shown. Further, the input process part 182 extracts a CG image plane such as a map from a recording server not shown on the basis of metadata.

The recording part 183 is a recording medium such as HDD (Hard Disk Drive) or RAID (Redundant Array of Inexpensive Disks) composed of a plurality of HDDs, which records image data, voice data and metadata from the input process part 182.

The voice mixer 184 is able to input a plurality of voice data, simultaneously, supplied by an input system of a plurality of channels from the recording part 183 to process voice data. For example, by gradually raising a voice level of the other voice data while gradually lowering a voice level of one voice data, one voice data can be shifted smoothly to the other voice data. The voice mixer 184 supplies the processed voice data to the recording part 183.

The special effect process part 185 is able to input, simultaneously, a plurality of image data supplied by an input system of a plurality of channels from the recording part 183. The voice mixer 184 is provided to apply, for example, special effect such as fade-in/fade-out of image data, The special effect process part 185 supplies image data having special effect process added thereto to the recording part 183.

The output process part 185 is controlled by a control part 187 to input edited image data, voice data and metadata from the recording part 183 to convert it to the SDI format for output.

The control part 187 sums up and controls the above-described parts, and in addition, administrates metadata supplied from the input process part 182, and modifies contents of metadata as necessary or produces new metadata. Further, the control part 187 sends metadata to the output process part 186.

The memory 188 stores the edited result carried out in the voice mixer 184 and the special effect process part 185 as EDLInformation (EDL: Edition Decision List) as metadata based on the edited result. Further, the memory 188 stores it as Script which is metadata based on an article original input in the input operating part 181 or metadata showing article contents. The prepared EDL_Information and Script are sent to the output process part 186. Hereupon the edited result shows information relating to an editing point in which an in-point and an out-point on the recording medium are expressed by Reel Number of a time code.

The monitor 107 shown in FIG. 8 is provided to input image data, voice data and metadata transmitted in the SDI format and carries out various displays relating to an image reproduced by the recording/reproducing device 106 and operation. The monitor 107 shown in FIG. 8 is provided to input image data, voice data and metadata transmitted in the SDI format and carries out displays of information necessary for editing carried out by the editing device 109 and images.

The joint administrative device 111 shown in FIG. 8 sums up and administrates additional information such as image data, voice data and metadata in the image processing system 1 and the whole information in producing a news program, which corresponds to NCS 60 shown in FIG. 1. Concretely, the joint administrative device 111 carries out administration of on-air items and material administration if what material receives what stage of process, and in addition, carries out administration of buying and selling of material relative to other broadcasting stations through an input/output terminal 113 conceited to the joint administrative device 111. Further, an article prepared by a journalist is input from a journalist terminal 112 connected to the joint administrative device 111.

The journalist terminal 112 and the input/output terminal 113 shown in FIG. 8 is in a relation of the joint administrative device 111 and a host, a client, and can be connected to the joint administrative device 111 as a host computer to perform various input/output work with respect to the joint administrative device 111. The input/output terminal 113 can be connected to an external network to carry out exchange of various data between other terminals present in the external network, and buying and selling of various data as the case may be. Information of exchange and buying and selling of various data is administrated by the joint administrative device 111.

The recording device for archive 114 shown in FIG. 8 is a device for archiving broadcasting material edited, which is provided with a recording medium, for example, such as HDD. Although not shown, the recording device for archive 114 may comprise a long period recording part for archiving broadcasting material for a long period, and a temporary recording part for archiving, for a given period, broadcasting material having possibility of being used again during a given period. The recording device for archive 114 is designed to taken out broadcasting material being recorded freely in response to a request from the editing device 10 and the joint administrative device 111.

The authoring terminal 115 shown in FIG. 8 is a terminal for adding information different from broadcasting material on the time axis, such as shopping information relating to, for example, dress worn by a performer or a watch put on.

The media caster 116 shown in FIG. 8 is a terminal for adding additional information, for example, such as a home page address of a store selling dress and watches, relating to information different in time axis added by the authoring terminal 115.

The multiplexer 117 shown in FIG. 8 mixes a signal relating to additional information from the media caster 116 and a signal of broadcasting material in the SDI format from the editing device 109 to produce broadcasting material which is delivered finally, that is, as a program constitution for a viewer. The multiplexer 117 supplies the broadcasting material to a delivery part 119.

The delivering image and voice recording device 118 shown in FIG. 8 temporarily records delivering broadcasting material constituted in the SDI format sent from the editing device 109, and is provided with a recording medium such as HDD. The delivering image and voice recording device 118 supplies broadcasting material to the delivery part 119.

The delivery part 119 delivers broadcasting material supplied from the multiplexer 117 and the delivering image and voice recording device 118. The delivery part 119 extracts metadata, particularly metadata which seems to be necessary on the receiving side out of metadata supplied in the SDI format to deliver it together with image data and voice data.

The above-described constitution corresponds to a broadcasting station for producing and transmitting broadcasting material, whereas the set top box 120 and the television 121 are provided on the side for receiving broadcasting material supplied from the broadcasting station.

The set top box 120 is a connection device for connecting various communication terminals, which is a receiving device provided with a bidirectional communication function, an Internet connection function, and a CATV connection function. The set top box 120 receives an electric wave of broadcasting material delivered from the delivery part 119 to supply it to the television 121. The television 121 processes a signal supplied to display it.

In the following, operation of the respective devices when a news program is produced using the aforementioned image processing apparatus 1 will be explained. First, contents of gathering are decided in the stage of the planning step 11 shown in FIG. 11. In the joint administrative device 111 shown in FIG. 8, metadata relating to the gathering are input on the basis of the gathering contents. In the joint administrative device 111, the metadata are transmitted to the data administrative device 103 for transmitting the metadata to the image pick-up device 101 going to gathering. Metadata are transmitted to the image pick-up device 101 by the data administrative device 103.

Figure 21:
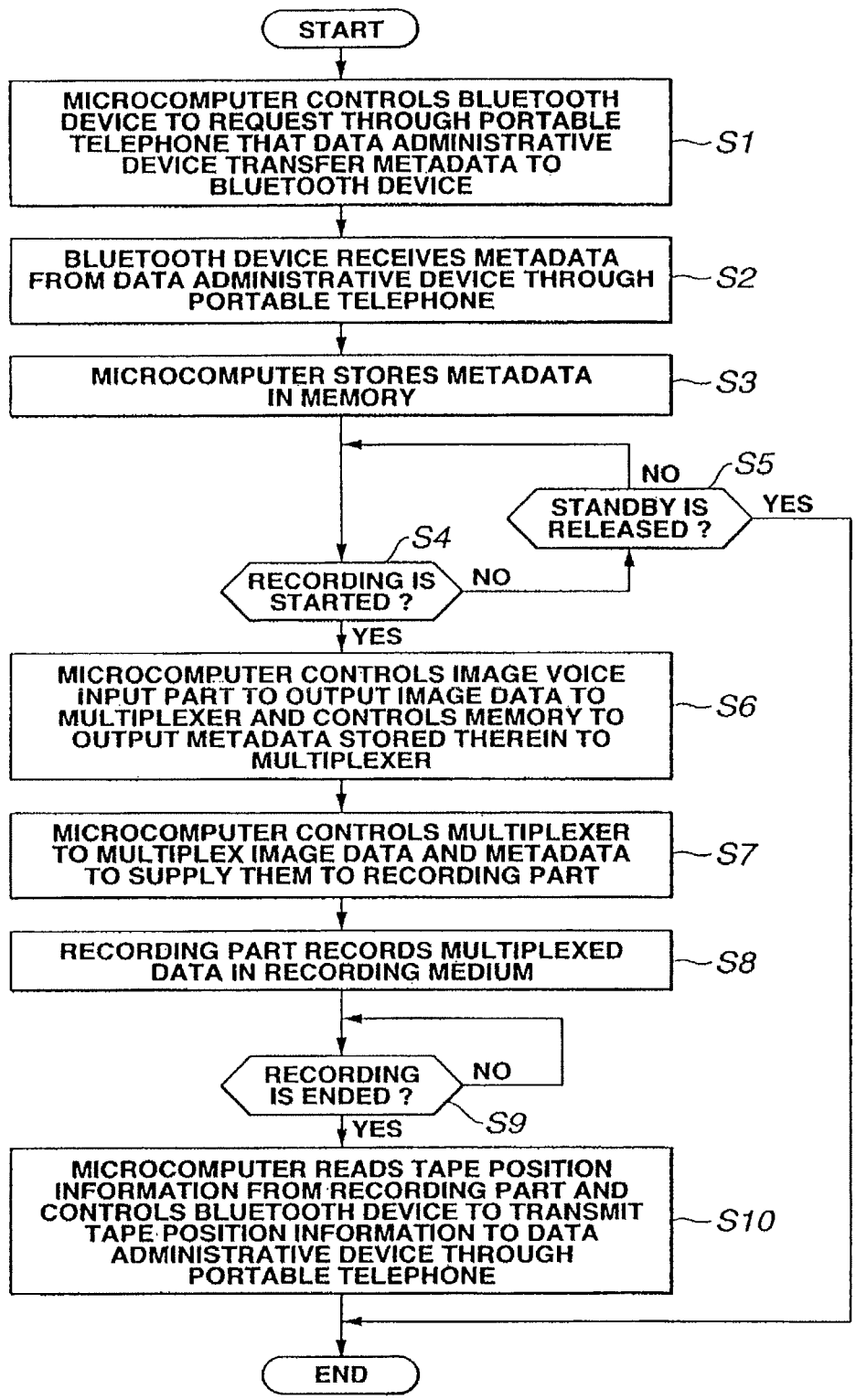
FIG. 21 is a flow chart showing a process when an image pick-up device receives metadata transmitted from a data administrative device in an image processing system shown as one constitutional example of the present invention.

First, operation of the image pick-up device 101 will be explained with reference to FIG. 21. When the operating part 132 is operated in a predetermined timing by a user who takes photograph using the image pick-up device 101 to indicate a transfer request of metadata, the microcomputer 140 of the image pick-up device 101 controls, in Step S1, the bluetooth device 137 to request through the portable telephone 102 that the data administrative device 103 transfer metadata to the bluetooth device 137.

The metadata transferred is metadata decided in the stage of the planning step 11 shown in FIG. 1. Concretely, this corresponds to metadata representative of a gathering location name, a photographer, a journalist, a director, a description relating to contents, gathering start date time, gathering end date time, a producer, a news gathering item, and NCS ID.

However, out of the above-described metadata, metadata other than the description relating to contents and the news gathering item are metadata input temporarily, which are suitably modified in the step described later.

This metadata is input every image pick-up device before starting gathering from the material administrative device 108 on the basis of the gathering plan before gathering, and is stored in advance in the recording part of the material administrative device 108 not shown in FIG. 8.

The individual image pick-up device is assigned in advance, and is recognized by ID stored in the memory 136, or the telephone number of the portable telephone together with the image pick-up device 101. Accordingly, metadata of a plurality of image pick-up devices are controlled every machine ID of the image pick-up device or the telephone number of the portable telephone 102.

Metadata shown in FIG. 22 is for the image pick-up device 101 used for gathering together with the portable telephone 102 whose telephone number is, for example, "090-xxxx-xxxx".

In this case, as the gathering start date time, "2000/3/3 9:00-10:00", "2000/3/3 13:00-14:00", and "2000/3/3 17:00-19:00" are shown, and NCS ID corresponding thereto are shown as in "0001", "0002", and "0003". Corresponding to the NCS ID, as news gathering titles, there are shown "Prime minister interview", "Street interview", and "Press club gathering". Similarly, a photographer and a journalist are shown corresponding thereto.

Figure 23:
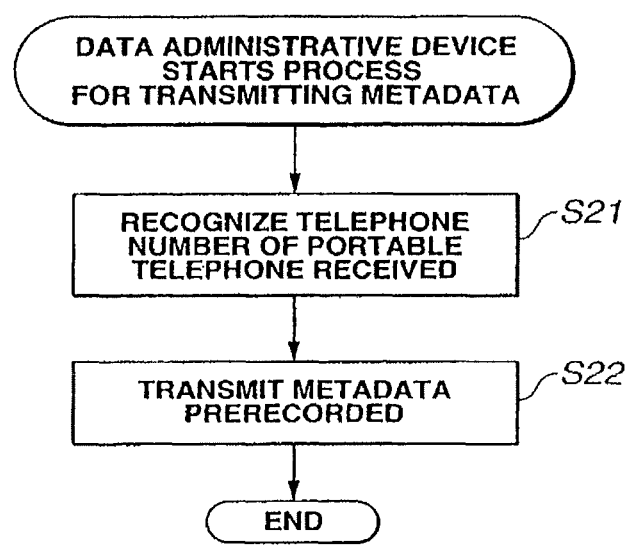
FIG. 23 is a flow chart for explaining a process when a data administrative device receives metadata in an image processing system shown as one constitutional example of the present invention.

Hereupon, the process in the data administrative device 103 when transfer of metadata is requested from the image pick-up device 101, in the step of Step S1, will be explained with reference to FIG. 23.

When a request of metadata from the image pick-up device 101 is received through the portable telephone 102, the data administrative device 103 recognizes, in Step S21, the telephone number of the portable telephone 103 transmitting the received metadata or the machine ID of the image pick-up device 10.

In Step S22, the data administrative device 103 transmits, out of metadata of the image pick-up device 101 corresponding to the telephone number of the portable telephone 102 received, metadata corresponding to the time received to the portable telephone 102. For example, supposing that the image pick-up device 101 requests transfer of metadata at 9:00 on Mar. 3, 2000, the data administrative device 103 transmits metadata representative of a news gathering title "Prime Minister interview", a photographer and a journalist corresponding to NCS ID "0001" corresponding to that time to the image pick-up device 101 through the portable telephone 102.

Now returning to FIG. 21, a description will be made. In Step S2, the bluetooth device 137 receives metadata from the data administrative device 103 through the portable telephone 102, and notifies the microcomputer 140 the reception thereof.

In Step S3, the microcomputer 140 receives a notice telling that metadata are received from the bluetooth device 137, and temporarily stores the metadata received by the bluetooth device 137 in the memory 136.

In Step S4, the microcomputer 140 judges whether or not recording is started, and if judgement is made that recording is not started, the procedure proceeds to Step S5, and in a case where the status of recording standby is released, the microcomputer 140 terminates its process. On the other hand, in a case where recording standby is not released, the procedure returns to the step of Step S4. That is, th image pick-up device 101 repeats the processes of Steps S4 and S5 till recording standby is released to assume status of recording start waiting.

In Step S4, when judgment is made that recording is started, the procedure proceeds to Step S6, the microcomputer 140 controls the recording part 134 to read a time stamp at a recording start point of the recording medium to store it in the memory 136, and controls the bluetooth device 137 to transmit it to the data administrative device 103 through the portable telephone 102.

Further, the microcomputer 140 controls the image voice input part 131 to output image data to the multiplexer 135, and controls memory 136 to output metadata stored in the memory 136 to the multiplexer 135.

In Step S7, the microcomputer 140 controls the multiplexer 135 to multiplex image and voice data and metadata to supply them to the recording part 134 in the SDI format.

In Step S8, the recording part 134 records data in the SDI format having image data, voice data and metadata supplied from the multiplexer 135 multiplexed in the recording medium.

In Step S9, the microcomputer 140 judges whether or not recording is ended, and in a case where recording is not ended, status of recording end waiting, that is, recording status is continued.

On the other hand, when judgement is made that recording is ended in Step S9, the microcomputer 140 controls, in Step S10, the recording part 134 to read a time stamp showing a recording end point of the recording medium, and controls the bluetooth device 137 to transmit tape position information of the recording start point and the recording end point read to the data administrative device 103 through the portable telephone 102 to end the process.

The recording medium shown in FIG. 8 is, for example, a tape-like magnetic recording medium, particularly showing a digital video tape. The recording medium is able to record image and voice as digitalized image data and voice data, and is provided with a region capable of recording auxiliary data such as metadata other than image data and voice data. Further, the non-volatile memory 105a may be provided on the recording medium casing 105 so that auxiliary data is stored in the non-volatile memory 105a.

Figure 24:
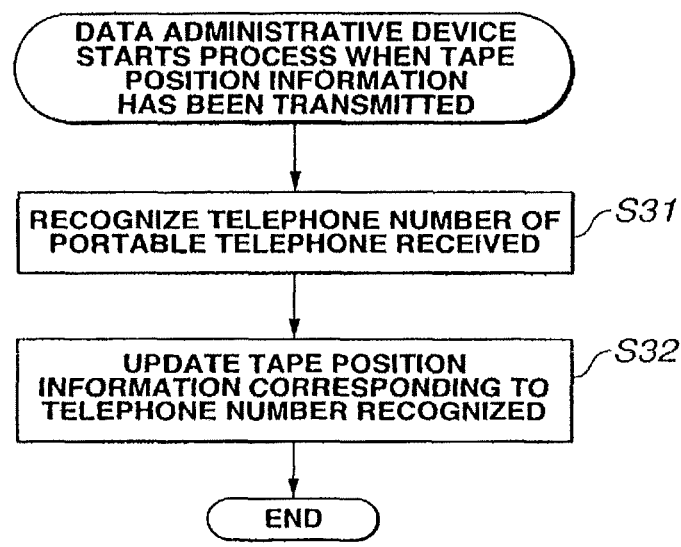
FIG. 24 is a flow chart for explaining a process when a data administrative device in an image processing system shown as one constitutional example of the present invention updates metadata.

In the following, there will be explained the process when the data administrative device 103 receives tape position information from the image pick-up device 101. When the data administrative device 103 receives tape position information from the image pick-up device 101 in Step S10 of FIG. 21, the data administrative device 103 recognizes the telephone number of the portable telephone 102 which is a transmission source of the received tape position information in Step S31 shown in FIG. 24.

In Step S32, the data administrative device 103 adds the above tape position information to metadata corresponding to the recognized telephone number out of metadata recorded in HDD not shown to record it.

While in the above explanation, a description has been made illustrating a photographer, a journalist, gathering state date time, a news gathering item, and NCS ID out of a gathering location name, a photographer, a journalist, a director, description relating to contents, gathering state date time, gathering end date time, a producer, a news gathering item, and NCS ID, it is noted that the same is true for a director, description relating to contents, gathering end date time, and a producer.

Further, there is metadata produced by the image pick-up device 101, added automatically and input. Concretely, the metadata are metadata, out of those shown in FIGS. 9 to 11, representative of gathering position (GPS latitude), gathering position (GPS longitude), gathering position (GPS altitude), gathering position (GPS time), a gathering location name, UMID (video), UMID (audio), a photographer, a journalist, a good shot marker, camera set up information, machine ID, a take number, a material start code, description relating to contents, an audio channel division, an audio type, gathering start date time, gathering end date time, a file owner, a shot number, a recording terminal, a recording port, right, and a news gathering title.

By recording metadata representative of information relating to material and tape position information in the recording medium and the data administrative device 103 as described above, it is possible to immediately retrieve and edit material data recorded in the recording medium.

Material data and metadata collected by the image pick-up device 101 and recorded in the recording medium are reproduced by the recording/reproducing device 106 shown in FIG. 8 and supplied as data of the SDI format to the material accumulation device 108. In the material accumulation device 108, image data, voice data and metadata transmitted in the SDI format are respectively separated and recorded in the recording part 173.

The controller 176 modifies contents of metadata as necessary, and produces new metadata. Metadata produced newly are metadata representative of UMID (video), UMID (audio), UMID (data), UMID (system), a good shot marker, a take number, a gathering start time code, description relating to contents, a valid date, an audio channel division, an audio type, source information, a recording format, a compression ratio, an audio channel number, an audio compression ratio, an audio sampling frequency, audio data size, a recording method, material ID, a sub-key, length of a file, gathering start date time, gathering end date time, a recording operator, a file owner, a shot number, a gathering period, GOP size, resolution, essence size, an object type, index, kind of index, an index memo, a sene number, a reel number, right, NCS ID, and a file status shown in FIGS. 9 to 11.

As described above, the material accumulation device 108 adds, when material is temporarily accumulated, metadata as described above to the recording part 173 of the material accumulation device 108 and the recording medium to input them whereby material can be identified clearly, and material data can be immediately retrieved and edited.

Image data, voice data and metadata recorded temporarily in the material accumulation device 108 are sent to the editing device 109 at timing according to necessity.

On the other hand, in the press terminal 112 connected to the joint administrative device 111, rough editing and article preparation are carried out by a journalist. When rough editing is carried out and an article prepared through the press terminal 112 is input, an editing decision list, and metadata representative of script shown in FIGS. 9 to 11 are added and input.

Further, the editing device 109 uses, out of the above-described metadata, metadata representative of, for example, gathering position (GPS latitude), gathering position (GPS longitude), gathering position (GPS altitude), gathering position (GPS time), a news gathering title, and script to prepare a CG combined image plane automatically. In the press terminal 112, a journalist may carry out rough editing on the basis of the CG combined image plane prepared automatically to edit the CG combined image plane freely.

The automatically combined CG combined image plane is further edited by an operator operating a GUI (Graphical User Interface) image plane. Operation of editing in the GUI image plane will be explained with reference to FIGS. 25, 26 and 27.

Figure 25:
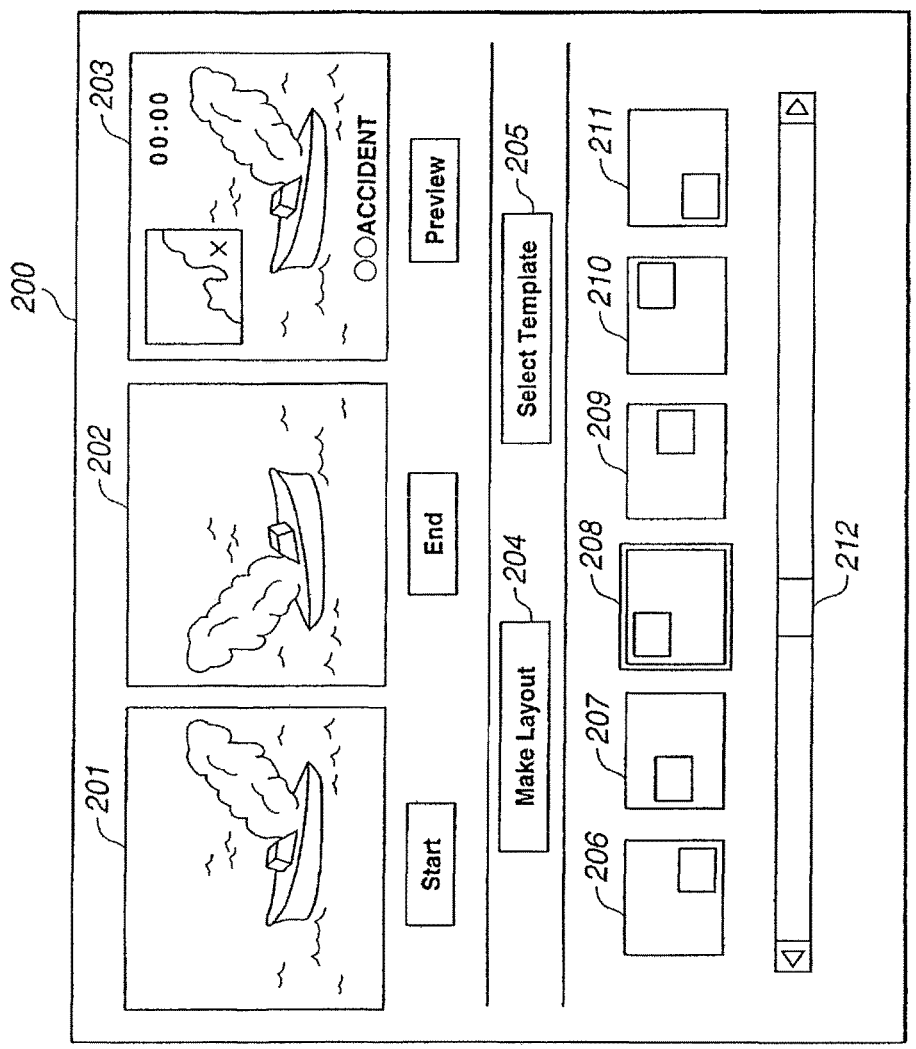
FIG. 25 is a schematic view for explaining a graphical user interface for preparing CG combined image plane in an image processing system shown as one constitutional example of the present invention.

FIG. 25 schematically shows a GUI image plane 200 for editing a CG combined image plane prepared automatically. In FIG. 25, an image 201 shows a frame for staring CG combination. An image 202 shows a frame for ending CG combination. A combined image 203 shows a CG combined image plane prepared automatically. A manual selection button 204 is a button for carrying out selection for switching to an image plane on which position change for combining CG is carried out manually. A template selection button 205 is a button for changing combined position of CG. Templates 206, 207, 208, 209, 210 and 211 show the respective patterns of combined position of CG. In FIG. 25, it is displayed by a position pattern of the template 208 to which a frame is attached. A scroll bar 212 is a scroll bar for selecting templates 206 to 211.

Figure 26:
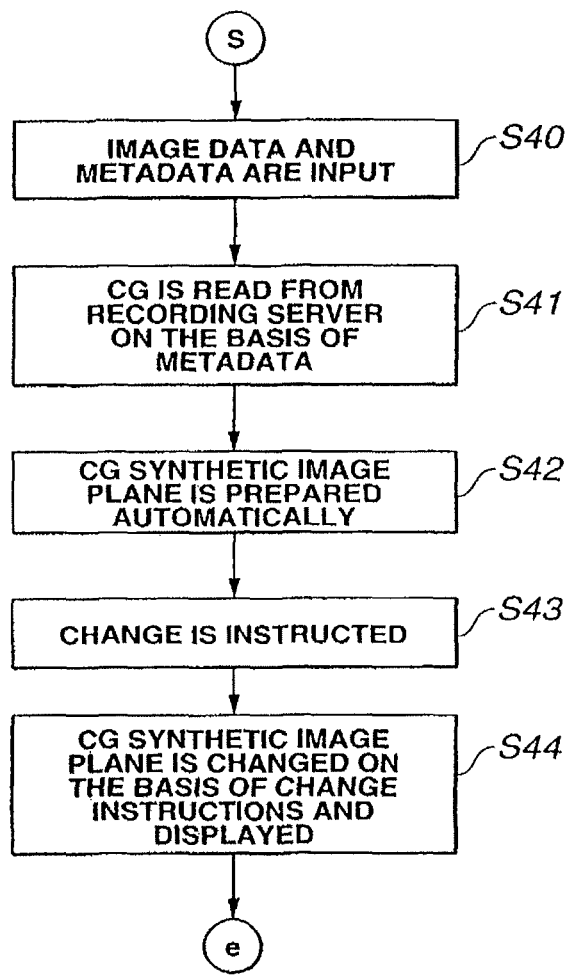
FIG. 26 is a flow chart showing a process when an editing device retrieves a map on the basis of position information to combine it with image data in an image processing system shown as one constitutional example of the present invention.
Figure 27:
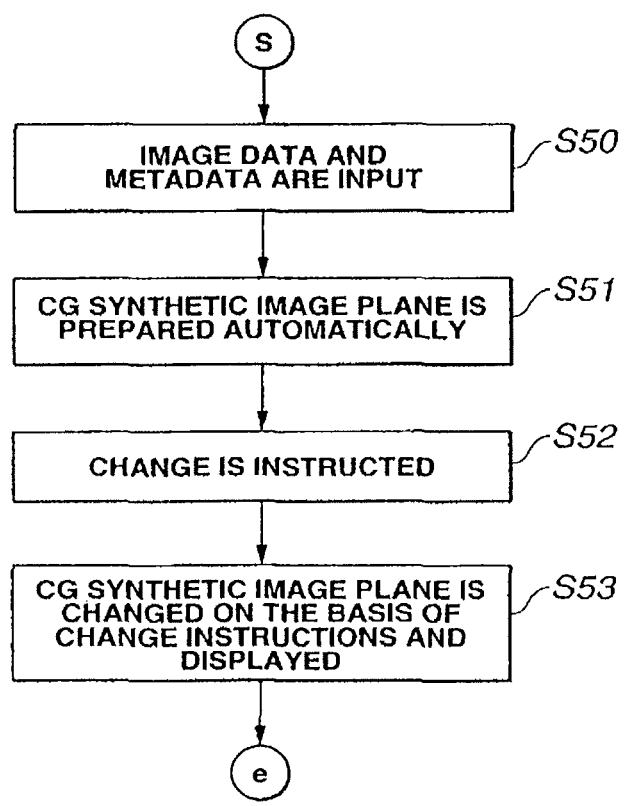
FIG. 27 is a flow chart showing a process when an editing device display time information and a title in an image processing system shown as one constitutional example of the present invention.

Editing of CG combined image plane is carried out on the basis of steps shown in FIG. 26 and FIG. 27. The steps shown in FIG. 26 and FIG. 27 show a process in which the template selection button 205 is selected, and the CG combined image plane is displayed on the basis of the prepared template.

A process for synthesizing and displaying a map relating to image data will be explained with reference to FIG. 26. In Step S40, image data and metadata representative of position information are input. Then, in Step S41, a map corresponding to position information is read out of a recording server recording a map or the like not shown on the basis of position information shown by metadata. In Step S42, a CG combined image plane is prepared automatically.

Then, in Step S43, when a change of a template is instructed, the CG combined image plane based on the template is displayed in accordance with the instructions in Step S44.

On the other hand, a process for synthesizing and displaying time information relating to image data or a title is shown with reference to FIG. 27. For time information, title or the like, metadata representative of time information and metadata representative of a title are used. That is, in Step S50, image data and metadata as time information and title information are input. Then, in Step S51, a CG combined image plane is prepared automatically.

Then, when in Step S52, a change of a template is instructed, the CG combined image plane is changed in accordance with the instructions and displayed in Step S53.

For example, information of time information, the form of a character of a title, character size and the like are sometimes read from a recording server and displayed.

As described above, by using metadata showing position information decided by GPS and metadata showing contents of an article, it is possible to extract map information and characters displayed on the image plane and to carry out the CG combined image plane automatically using the extracted characters.

Following the rough editing, the complete editing is carried out in the editing device 10. In the complete editing, further strict editing is carried out in order to place material roughly edited in an actually broadcasting state. With the editing, concretely, metadata representative of a director, a producer, and an editing decision list out of metadata shown in FIGS. 9 to 11 are newly input. With respect to metadata other than those described above, metadata used in the previous stages or metadata input in the previous stage are used again. In the complete editing, various information described as metadata are used for editing.

Metadata representative of EDL Information, Script input in the press terminal 112 is decided in the complete editing process in the editing device 109.

Broadcasting material edited in the editing device 109 is mixed with other information added in the authoring terminal 115 and the media caster 116 in the multiplexer 117 and sent to the delivery part 119 in FIG. 8.

The process for delivering broadcasting material from the delivery part 119 corresponds to the broadcasting step 44 in FIG. 1. In the delivery part 119, metadata representative of change date time and a distribution flag are newly input. With respect to the above-described metadata, metadata used in the previous stage or metadata input in the previous stage is used again in the broadcasting step 44.

When delivered from the delivery part 119, metadata needed on the receiving side out of metadata shown in FIGS. 9 to 11 are extracted and transmitted.

Broadcasting material is recorded, after delivery, in the recording device for archive 114, and administrated by the joint administrative device 111. Metadata input newly when broadcasting material is recorded in the recording device for archive 114 include archive date time, an archive operator, an archive terminal, an archive flag, and a compile flag.

With respect to metadata other than those described above, metadata used in the previous stage or metadata input in the previous stage are used again in the archive stage.

According to the image processing system 1 described above in detail, when a news program is produced in a broadcasting station, in the respective stages of the prior-photograph stage 10, the photograph producing stage 20, the post-photograph stage 30, the broadcast stage 40, and the archive stage 50, metadata for identifying image data and voice data is recorded in the recording medium or the recording device, and therefore, a burden on a photographer and an editor can be relieved. Further, when an editor handles material, the material data can be immediately retrieved and edited.

While in the above explanation, a description has been made of an example in which the bluetooth device 137 is used for communication between the image pick-up device 101 and the portable telephone 102, it is noted that communication between the image pick-up device 101 and the portable telephone 102 may be carried out by arranging a serial port and a modem by wire. Even in this case, the process by the image pick-up device 101 and the data administrative device 103 is similar to the case described previously.

Further, a series of processes described above can be done by hardware, but can be also done by software. In a case where a series of processes are executed by software, the software is installed, from a recording medium, on a computer in which a program constituting the software is incorporated in an exclusive-use hardware, or for example, a general personal computer capable of causing various functions to execute by installing various programs.

This recording medium is not only presented to a user in the state that being incorporated in advance in the image pick-up device 101 as HDD 133, but also is presented as a recording medium having a program recorded. The recording medium includes recording media such as a magnetic disk, an optical disk, a photomagnetic disk, or a semiconductor memory.

INDUSTRIAL APPLICABILITY

An image processing apparatus according to the present invention comprises an input part for inputting image data, an image receiving part for receiving production information relating to production transmitted form another apparatus, a recording part for recording production information received by the receiving part and image data input by the input part in a recording medium, a detection part for detecting a recording position of an editing point of image data recorded by the recording part on the recording medium, and a transmission part for transmitting information of the recording position detected by the detection part.

Accordingly, when the image processing apparatus according to the present invention as described is applied, particularly, to a system for producing a program in a broadcasting station, various identification information such as identification information for identifying image data and voice data, information relating to copyright and so on can be recorded in a recording medium together with image data and voice data. Further, a burden when a photographer or an editor carries out photographing and or editing is relieved and convenience is improved.

Further, an image processing apparatus according to the present invention comprises an input step of inputting image data, a receiving step of receiving production information relating to production transmitted form another apparatus, a recording step of recording production information received by the receiving step and image data input by the input step in a recording medium, a detection step of detecting a recording position of an editing point of image data recorded by the recording step on the recording medium, and a transmission step of transmitting information of the recording position detected by the detection step.

Accordingly, when the image processing apparatus according to the present invention as described is applied, particularly, to a system for producing a program in a broadcasting station, various identification information such as identification information for identifying image data and voice data, information relating to copyright and so on can be recorded in a recording medium together with image data and voice data. Further, identification information is recorded together with image data and voice data whereby a burden when a photographer or an editor carries out photographing and or editing is relieved and convenience is improved.

Further, a recording medium having a program recorded, the program controlling an image processing apparatus for recording image data in a recording medium according to the present invention, the recoding medium having a program for causing a computer to execute a process including an input control step of controlling an input of image data, an incorporation control step of controlling an incorporation of production information relating to production transmitted from another apparatus, a record control step of controlling recording of production information whose incorporation is controlled in the incorporation control step and image data input in the input control step to the recording medium, a detection control step of controlling detection of a recording position of an editing point of image data record in the record control step on the recording medium, and a transmission control step of controlling transmission of information of the recording position detected in the detection control step to another apparatus.

Accordingly, when a program recorded in the recording medium according to the present invention as described is applied, particularly, to an image pick-up device in a broadcasting station, identification information for identifying image data and voice data, information relating to copyright and so on, and another identification information can be recorded in a recording medium together with image data and voice data. Further, identification information is recorded together with image data and voice data whereby a burden when a photographer or an editor carries out photographing and or editing is relieved and convenience is improved.

Furthermore, an image processing apparatus according to the present invention comprises an input part for inputting production information relating to production by another apparatus, a storage part for storing production information input by the input part corresponded to another apparatus, a transmission part for transmitting production information stored in the storage part to another apparatus, a receiving part for receiving position information of an editing point of image data recorded in a recording medium on the recording medium, and an adding part for adding position information received by the receiving part to production information stored in the storage part.

Accordingly, when the image processing apparatus according to the present invention as described is applied, particularly, to an image pick-up device in a broadcasting station, identification information for identifying image data and voice data, information relating to copyright and so on, and another identification information can be recorded in a recording medium together with image data and voice data. Further, identification information is recorded together with image data and voice data whereby a burden when a photographer or an editor carries out photographing and or editing is relieved and convenience is improved.

Furthermore, an image processing method according to the present invention includes an input step of inputting production information relating to production by another apparatus, a storage step of storing production information input by the input step corresponded to another apparatus, a transmission step of transmitting production information stored in the storage step to another apparatus, a receiving step of receiving position information of an editing point of image data recorded in a recording medium on the recording medium, and an adding step of adding position information received by the receiving step to production information stored in the storage step.

Accordingly, when the image processing method according to the present invention as described is applied, particularly, to an image pick-up device in a broadcasting station, identification information for identifying image data and voice data, information relating to copyright and so on, and another identification information can be recorded in a recording medium together with image data and voice data. Further, identification information is recorded together with image data and voice data whereby a burden when a photographer or an editor carries out photographing and or editing is relieved and convenience is improved.

Furthermore, a recording medium, according to the present invention, having a program recorded, the program controlling an image processing apparatus for administrating image data recorded in a recording medium by another image processing apparatus, the recording medium having a program for causing a computer to execute a process recorded, the process including an input control step of controlling an input of production information relating to production by another apparatus, a storage control step of controlling storing production information input in the input control step corresponded to another apparatus, a transmission control step of controlling transmitting production information stored in the storage control step to another apparatus, an incorporation control step of controlling incorporating position information at an editing point of image data recorded in a recording medium transmitted from another apparatus on the recording medium, and an addition control step of controlling addition of position information incorporated in the incorporation control step to production information stored in the storage control step.

Accordingly, when the program recorded in the recording medium according to the present invention as described is applied, particularly, to an image pick-up device in a broadcasting station, identification information for identifying image data and voice data, information relating to copyright and so on, and another identification information can be recorded in a recording medium together with image data and voice data. Further, identification information is recorded together with image data and voice data whereby a burden when a photographer or an editor carries out photographing and or editing is relieved and convenience is improved.

Furthermore, an image processing system according to the present invention comprising a first image processing apparatus for recording image data in a recording medium, and a second image processing apparatus for administrating image data recorded in the recording medium by the first image processing apparatus, the first image processing apparatus comprising a first input part for inputting image data, a first receiving part for receiving production information relating to production transmitted from the second image processing apparatus, a recording part for recording production information received by the first receiving part and image data input by the first input part, a detection part for detecting a recording position at an editing point of image data recorded by the recording part on the recording medium, and a first transmission part for transmitting information of a recording position detected by the detection part to the second image processing apparatus, the second image processing apparatus comprising a second input part for inputting production information relating to production by the first image processing apparatus, a storage part for storing production information input by the second input part corresponded to the first image processing apparatus, a second transmission part for transmitting production information stored in the storage part to the first image processing apparatus, a second receiving part for receiving position information at an editing point of image data recorded in a recording medium transmitted from the first image processing apparatus on the recording medium, and an addition part for adding position information received in the second receiving part to production information stored in the storage part.

Accordingly, when the image processing system according to the present invention as described is applied, particularly, to a system for producing a program in a broadcasting station, identification information for identifying image data and voice data, information relating to copyright and so on, and another identification information can be recorded in a recording medium together with image data and voice data. Further, identification information is recorded together with image data and voice data whereby a burden when a photographer or an editor carries out photographing and or editing is relieved and convenience is improved.

Furthermore, according to an image processing method of the present invention, a first image processing method of the first image processing apparatus includes a first input step of inputting image data, a first receiving step of receiving production information relating to production transmitted from the second image processing apparatus, a recording step of recording production information received in the first receiving step and image data input in the first input step, a detection step of detecting a recording position at an editing point of image data recorded in the recording step on the recording medium, and a first transmission step of transmitting information of a recording position detected in the detection step to the second image processing apparatus, and an image processing method of the second image processing apparatus includes a second input step of inputting production information relating to production by the first image processing apparatus, a storage step of storing production information input in the second input step corresponded to the first image processing apparatus, a second transmission step of transmitting production information stored in the storage step to the first image processing apparatus, a second receiving step of receiving position information at an editing point of image data recorded in a recording medium transmitted from the first image processing apparatus on the recording medium, and an addition step for adding position information received in the second receiving step to production information stored in the storage step.

Accordingly, when the image processing method according to the present invention as described is applied, particularly, to a system for producing a program in a broadcasting station, identification information for identifying image data and voice data, information relating to copyright and so on, and another identification information can be recorded in a recording medium together with image data and voice data. Further, identification information is recorded together with image data and voice data whereby a burden when a photographer or an editor carries out photographing and or editing is relieved and convenience is improved.

Furthermore, the present invention provides a recording medium having programs for controlling an image processing system recorded, the image processing system comprising a first image processing apparatus for recording image data in a recording medium, and a second image processing apparatus for administrating image data recorded in the recording medium by the first image processing apparatus, the program for controlling the first image processing apparatus including a first input control step of controlling an input of image data, a first incorporation control step of controlling incorporation of production information relating to production transmitted from the second image processing apparatus, a record control step of controlling recording of production information incorporated in the first incorporation control step and image data input in the first input control step in the recording medium, a detection control step of controlling detection of a recording position of an editing point of image data recorded in the record control step on the recording medium, and a first transmission control step of controlling transmission of information of the recording position detected in the detection control step, the program for controlling the second image processing apparatus having a program for causing a computer to execute a process recorded, the process including a second input control step of controlling an input of production information relating to production by the first image processing apparatus, a storage control step of controlling storing production information input in the second input control step corresponded to the first image processing apparatus, a second transmission control step of controlling transmission of production information stored in the storage control step to the first image processing apparatus, a second incorporation control step of controlling incorporation of position information at an editing point of image data recorded in the recording medium transmitted from the first image processing apparatus on the recording medium, and an addition control step of controlling adding position information incorporated in the second incorporation step to production information stored in the storage control step.

Accordingly, when the program recorded in the recording medium according to the present invention as described is applied, particularly, to the process in an image pick-up device, identification information for identifying image data and voice data, information relating to copyright and so on, and another identification information can be recorded in a recording medium together with image data and voice data. Further, identification information is recorded together with image data and voice data whereby a burden when a photographer or an editor carries out photographing and or editing is relieved and convenience is improved.

Furthermore, a data transmission device according to the present invention comprises an input par for producing and inputting, addition information relating to news program gathering, and a transmission part for transmitting addition information to a mover at a gathering source wirelessly.

The addition information are metadata representative of Gathering_Location_Place showing a place name of a gathering location, Photographer showing a name of a photographer, Journalist Information showing information relating to a journalist in charge of gathering, Director showing a director of a news program, Contents having other information relating to production contents described, Gathering_Start_DateTime showing production start date time, Gathering_End_DateTime showing production end time, Producer showing a producer of a news program, a news program item registered in NCS (Newsroom Computer System) and NCS ID as a identifier set every program.

Accordingly, in the data transmission device according to the present invention, when a news program is produced in a broadcasting station, metadata as various addition information such as identification information for identifying image data and voice data, information relating to copyright and so on, can be transmitted to an image pick-up device together with image data and voice data. Further, metadata as addition information is recorded together with image data and voice data whereby a burden when a photographer or an editor carries out photographing and or editing is relieved and convenience is improved.

Furthermore, a receiving device according to the present invention comprises a receiving part for receiving addition information relating to a news program gathering transmitted from a data transmission device, and a storage part for storing the addition information received.

Accordingly, in the data receiving device according to the present invention, when a news program is produced in a broadcasting station, metadata as various addition information such as identification information for identifying image data and voice data, information relating to copyright and so on can be received in order to record in a recording medium together with image data and voice data. Further, metadata as addition information is recorded together with image data and voice data whereby a burden when a photographer or an editor carries out photographing and or editing is relieved and convenience is improved.

Furthermore, a data transmission and receiving system according to the present invention comprises a data transmission device having an input part for producing and inputting addition information relating to a news program gathering, and a transmission part for transmitting addition information wirelessly; and a data receiving device having a receiving part for receiving addition information relating to news program gathering transmitted from the data transmission device, and a storage part for starring addition information received.

Accordingly, in the data transmission and receiving device according to the present invention, when a news program is produced in a broadcasting station, metadata as various addition information such as identification information for identifying image data and voice data, information relating to copyright and so on can be received in order to record in a recording medium together with image data and voice data. Further, metadata as addition information is recorded together with image data and voice data whereby a burden when a photographer or an editor carries out photographing and or editing is relieved and convenience is improved.

Furthermore, an image processing apparatus according to the present invention comprises a storage part for storing metadata as addition information transmitted from outside, a metadata producing part for producing metadata separately from the metadata transmitted from outside, and a recording part for recording image data in a recording medium, wherein metadata from the metadata storage part and separate metadata from the metadata producing part are recorded in the recording medium.

The separate metadata are metadata representative of Gathering_Location_Latitude representative of latitude of a photographing location, Gathering_Location_Longitude representative of longitude of a photographing location, Gathering_Location_Altitude representative of altitude of a photographing location, Gathering_Location_Time representative of time at the time of photographing, machine ID for identifying an image pick-up device, Camera Setup Information showing setting of an image pick-up device, Reel Number for identifying a recording medium, Duration showing time required for photographing, Start Of Material representative of start time for each scene, Title showing a gathering title, Good Shot Mark showing a mark point input manually at the time of photographing and REC Start Mark, Audio Channel Information showing a microphone channel, Audio Type showing whether recording of voice is monophonic, or stereo or bilingual, UMID (Audio) which is ID decided solely for identifying material, UMID (Video), and Copyright representative of copyright of material data.

Accordingly, according to the image processing apparatus of the present invention, a user, in the metadata producing part, records addition information produced manually or automatically together with image data and voice data whereby when a news program is produced in a broadcasting station, metadata as various addition information such as identification information for identifying image data and voice data, information relating to copyright and so on can be received together with image data and voice data. Further, metadata as addition information is recorded together with image data and voice data whereby a burden when a photographer or an editor carries out photographing and or editing is relieved and convenience is improved.

Furthermore, an image processing method according to the present invention comprises metadata storage step of storing metadata transmitted from outside, metadata producing step of producing separate metadata transmitted from outside, and recording step of recording metadata from metadata storage step, separate metadata from metadata producing means, and image data in the recording medium.

Accordingly, according to the image processing method of the present invention, a user, in the addition information producing step, records addition information produced manually or automatically together with image data and voice data whereby when a news program is produced in a broadcasting station, metadata as various addition information such as information for identifying image data and voice data, information relating to copyright and so on can be received together with image data and voice data. Further, metadata as addition information is recorded together with image data and voice data whereby a burden when a photographer or an editor carries out photographing and or editing is relieved and convenience is improved.

Further, an image processing method of the present invention comprises input step of inputting image data, and metadata representative of Gathering_Location_Latitude representative of latitude of a photographing location relating to position information at the time of photographing image data, Gathering_Location_Longitude representative of longitude, and Gathering_Location_Altitude representative of altitude of a photographing location, and retrieving step of retrieving and extracting a map corresponding to position information out of maps recorded in the recording device, and combining step of combining a map corresponding to position information with a predetermined position of image data to display it.

As described above, metadata representative of Gathering_Location_Latitude, Gathering_Location_Longitude, and Gathering_Location_Altitude for identifying image data and voice data as addition information are recorded together with image data and voice data, and information recorded in a data base using addition information to be recorded can be extracted and combined with image data automatically.

Accordingly, metadata as addition information is recorded together with image data and voice data whereby when material is edited, material data and image data to be combined with the material data can be retrieved immediately. Further, other information based on addition information input together with image data can be retrieved automatically and combined with image data to display it.

Furthermore, an image processing method according to the present invention comprises input step of inputting image data, and metadata representative of Gathering_Location_Time representative of time of photographing relating to time information at the time of photographing image data, and combining step of combining time information corresponding to image data with a predetermined position of image data to display it.

Accordingly, metadata as addition information is recorded together with image data and voice data whereby when material is edited, material data and image data to be combined with material data can be retrieved immediately. Further, other information based on addition information input together with image data can be retrieved automatically and combined with image data to display it.

Furthermore, the present invention comprises input step of inputting image data, Title showing a gathering title relating to photographing of image data, and metadata representative of Script relating to an article original; and combining step of combining metadata with a predetermined position of image data to display it.

Accordingly, metadata as addition information is recorded together with image data and voice data whereby when material is edited, material data and image data to be combined with material data can be retrieved immediately. Further, other information based on addition information input together with image data can be retrieved automatically and combined with image data to display it.

Furthermore, the present invention comprises a display part for displaying a combined image of image data and information relating to image data, an input part for inputting image data, and metadata representative of Gathering_Location_Latitude representative of latitude of a photographing location relating to position information at the time of photographing image data, Gathering_Location_Longitude representative of longitude of a photographing location, Gathering_Location_Altitudes representative of altitude of a photographing location, Title showing a gathering title relating to photographing of image data, and Script relating to an article original; a recording part for recording metadata representative of position information; and a combining part for combining information based on metadata corresponding to image data with a predetermined position of image data to display it.

Accordingly, metadata as addition information is recorded together with image data and voice data whereby when material is edited, material data and image data to be combined with material data can be retrieved immediately. Further, other information based on addition information input together with image data can be retrieved automatically and combined with image data to display it.

What is claimed is:

1. An image processing apparatus comprising:
   a memory configured to store first metadata, the first metadata being generated in response to an input at a first external apparatus before image data is generated; and
   circuitry configured to
      generate second metadata related to the image data, and associate the image data with the first metadata and the second metadata for recording,
   wherein the image data associated with the first metadata and the second metadata is recorded on a second external apparatus.

2. The image processing apparatus according to claim 1, wherein the circuitry is configured to receive the first metadata by wireless communication from the first external apparatus.

3. The image processing apparatus according to claim 1, wherein the circuitry is further configured to output, in Serial Digital Interface (SDI) format, the image data associated with the first metadata and the second metadata.

4. The image processing apparatus according to claim 1, wherein the first metadata represents at least information about a person associated with the recording of the image data.

5. The image processing apparatus according to claim 4, wherein the first metadata represents at least information about the name of a person who performs a recording operation.

6. The image processing apparatus according to claim 1, wherein the second metadata represents at least camera information.

7. The image processing apparatus according to claim 6, wherein the camera information represents at least one of camera identification, lens data or information about an image sensor.

8. The image processing apparatus according to claim 1, wherein the second metadata represents at least time information related to recording.

9. The image processing apparatus according to claim 1, wherein the second metadata represents at least information about a mark point input with respect to the image data.

10. The image processing apparatus according to claim 1, further comprising: an operation device configured to receive an input at the image processing apparatus.

11. The image processing apparatus according to claim 1, wherein the image data is further associated with additional information generated in the second external apparatus.

12. The image processing apparatus according to claim 1, wherein the first external apparatus is a first external recording server.

13. The image processing apparatus according to claim 1, wherein the second external apparatus is a second external recording server.

14. An image processing method comprising:
   receiving first metadata, the first metadata being generated in response to an input at a first external apparatus before image data is generated;
   generating second metadata related to the image data, and
   associating the image data with the first metadata and the second metadata for recording, wherein the image data associated with the first metadata and the second metadata is recorded on a second external apparatus.

15. An image processing apparatus comprising:
a memory configured to store first metadata, the first metadata being generated in response to an input at an external apparatus before image data is generated; and
circuitry configured to
    generate second metadata related to the image data, and
    associate the image data with the first metadata and the second metadata for recording,
wherein the image data associated with the first metadata and the second metadata is recorded on the external apparatus.

16. The image processing apparatus according to claim 15, wherein the circuitry is configured to receive the first metadata by wireless communication from the external apparatus.

17. The image processing apparatus according to claim 15, wherein the circuitry is further configured to output, in Serial Digital Interface (SDI) format, the image data associated with the first metadata and the second metadata.

18. The image processing apparatus according to claim 15, wherein the first metadata represents at least information about a person associated with the recording of the image data.

19. The image processing apparatus according to claim 15, wherein the external apparatus is an external recording server.

20. An image processing method comprising:
receiving first metadata, the first metadata being generated in response to an input at an external apparatus before image data is generated;
    generating second metadata related to the image data, and
    associating the image data with the first metadata and the second metadata for recording,
wherein the image data associated with the first metadata and the second metadata is recorded on the external apparatus.

21. An image processing apparatus comprising:
a memory configured to store first metadata, the first metadata being received from a first external apparatus before recording image data; and
circuitry configured to
generate second metadata related to the image data, and
record the image data in association with the first metadata and the second metadata on a recording medium,
wherein the image data is further associated with additional information generated in a second external apparatus after the image data in association with the first metadata and the second metadata is recorded on the recording medium.

* * * * *